(12) United States Patent
Kumagai

(10) Patent No.: US 10,554,830 B2
(45) Date of Patent: Feb. 4, 2020

(54) IMAGE PROCESSING APPARATUS, CONTROL METHOD FOR CONTROLLING THE SAME, AND RECORDING MEDIUM

(71) Applicant: CANON KABUSHIKI KAISHA, Tokyo (JP)

(72) Inventor: Kanta Kumagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/218,313

(22) Filed: Dec. 12, 2018

(65) Prior Publication Data

US 2019/0191039 A1    Jun. 20, 2019

(30) Foreign Application Priority Data

Dec. 19, 2017  (JP) ................................ 2017-242442

(51) Int. Cl.
*G06F 3/12* (2006.01)
*H04N 1/00* (2006.01)
*G06K 9/32* (2006.01)
*G06T 7/11* (2017.01)
*G06K 15/00* (2006.01)

(52) U.S. Cl.
CPC ....... *H04N 1/00244* (2013.01); *G06K 9/3233* (2013.01); *G06T 7/11* (2017.01); *H04N 1/00129* (2013.01); *H04N 1/00167* (2013.01)

(58) Field of Classification Search
None
See application file for complete search history.

(56) References Cited

U.S. PATENT DOCUMENTS 8,176,075 B2 * 5/2012 Kuroyanagi .......... G06F 21/608
                                                   707/694
2005/0248805 A1 * 11/2005 Shima ................ H04N 1/00244
                                                   358/1.15

FOREIGN PATENT DOCUMENTS

JP          2015118437 A  *  6/2015

* cited by examiner

*Primary Examiner* — Dov Popovici
(74) *Attorney, Agent, or Firm* — Canon U.S.A., Inc. IP Division

(57) ABSTRACT

An image processing apparatus with a web browser function displays, in a predetermined display region on an operation unit, an operation manual of the image processing apparatus that is composed of a web page, stores an identifier for accessing a web page of the operation manual and a screen provided by an application included in the image processing apparatus, where, based on an identifier corresponding to a web page displayed on the operation unit and the screen, a display item is displayed for transitioning to a screen of a function provided by the application included in the image processing apparatus.

11 Claims, 26 Drawing Sheets

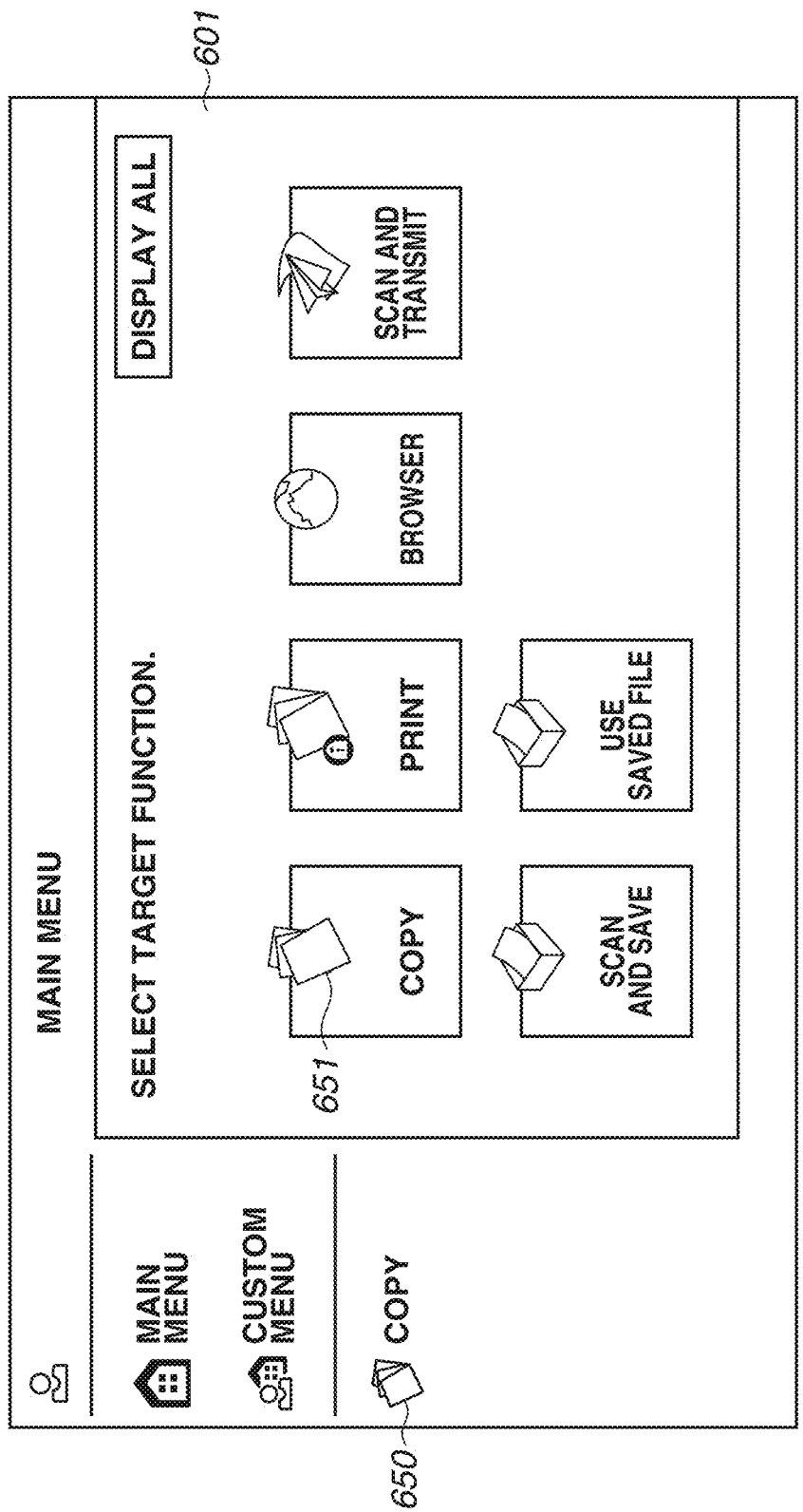

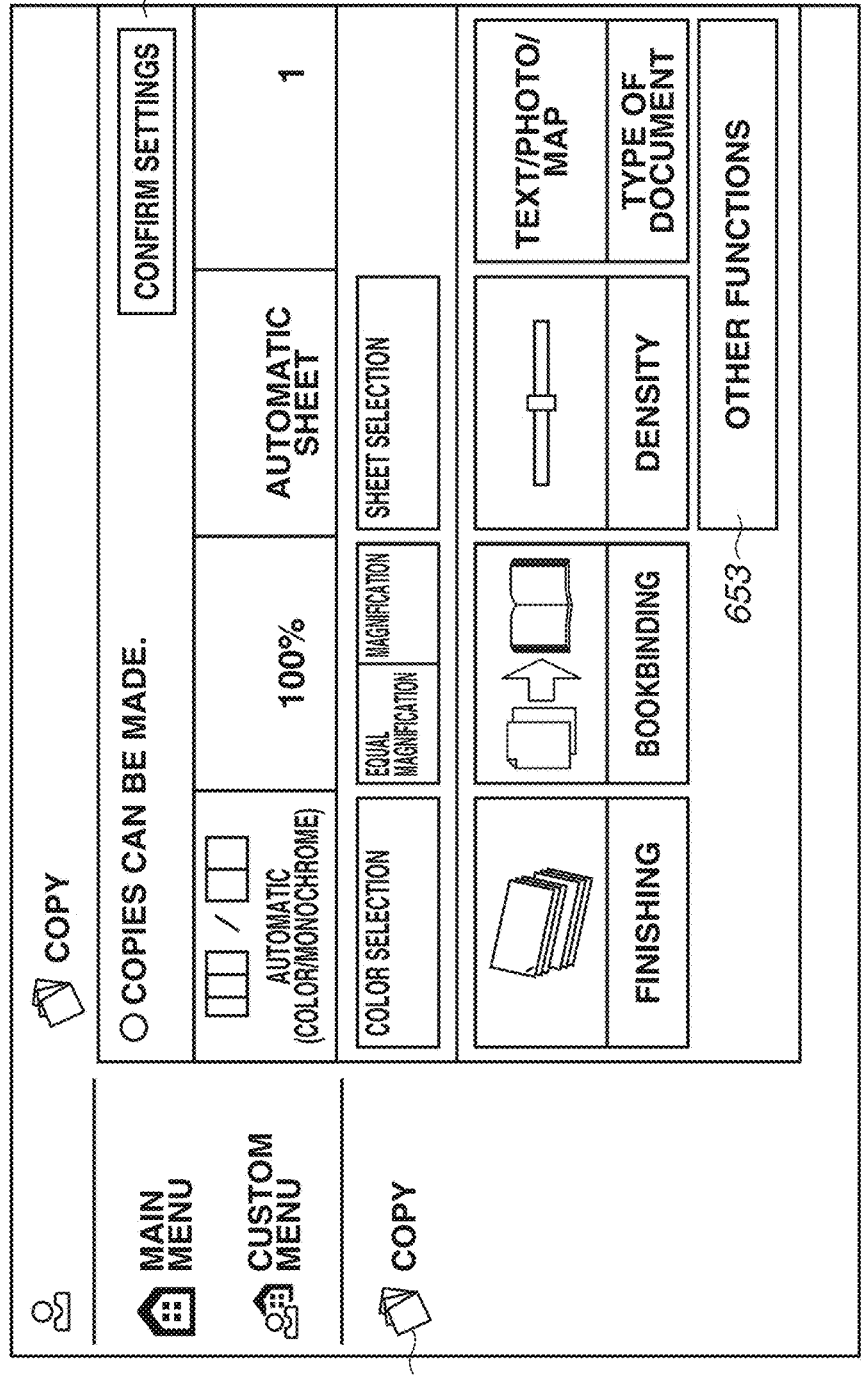

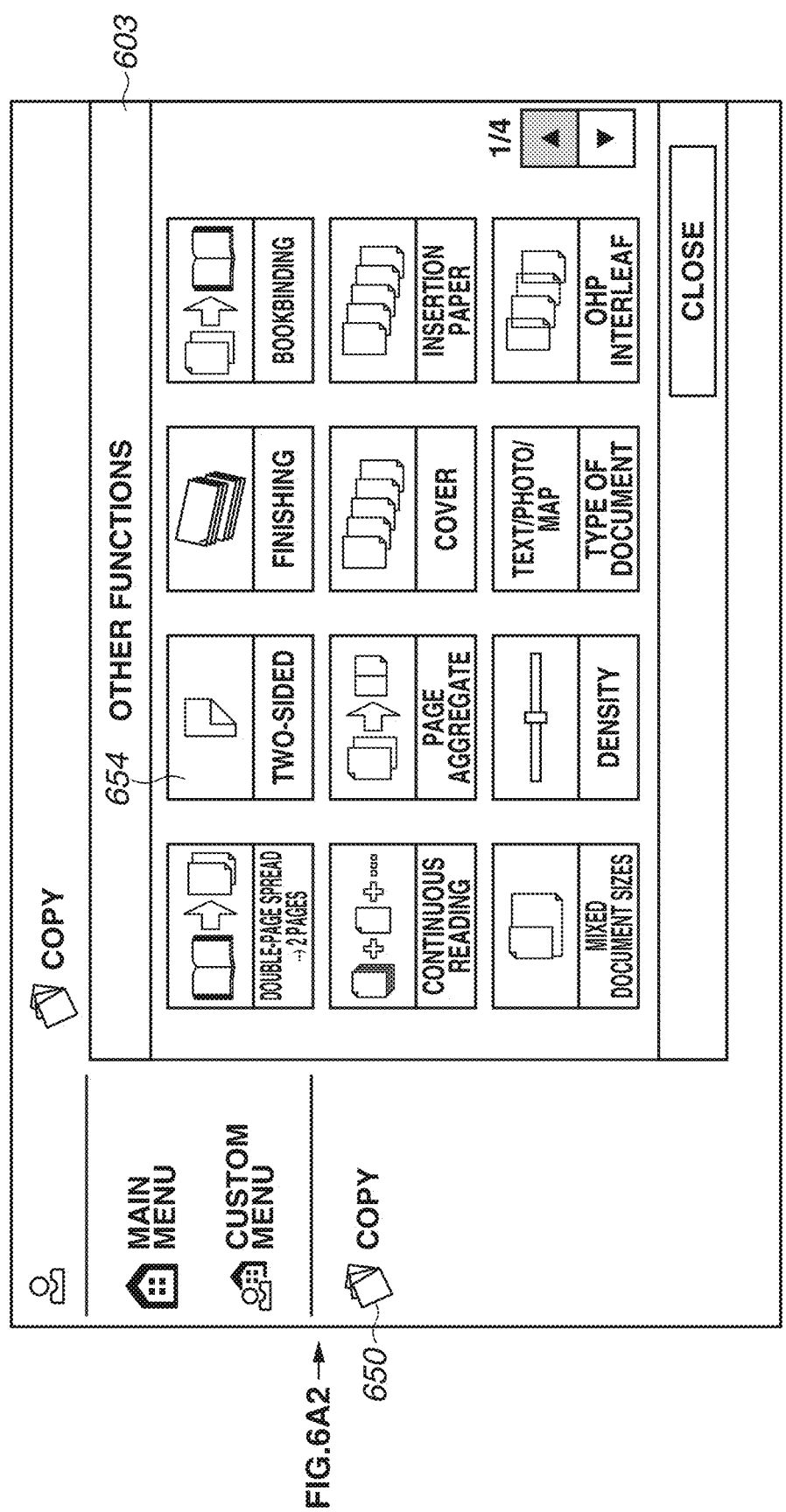

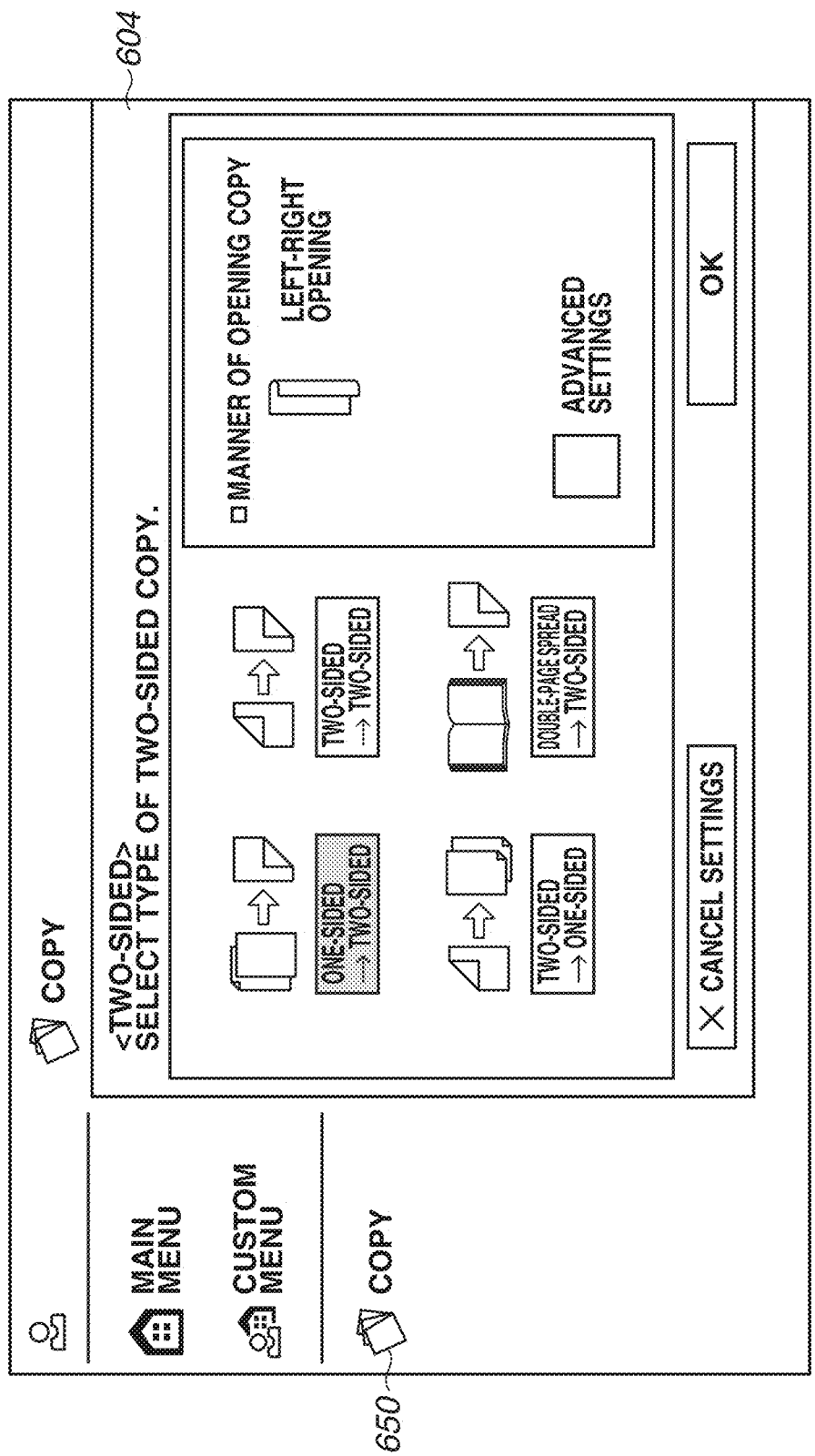

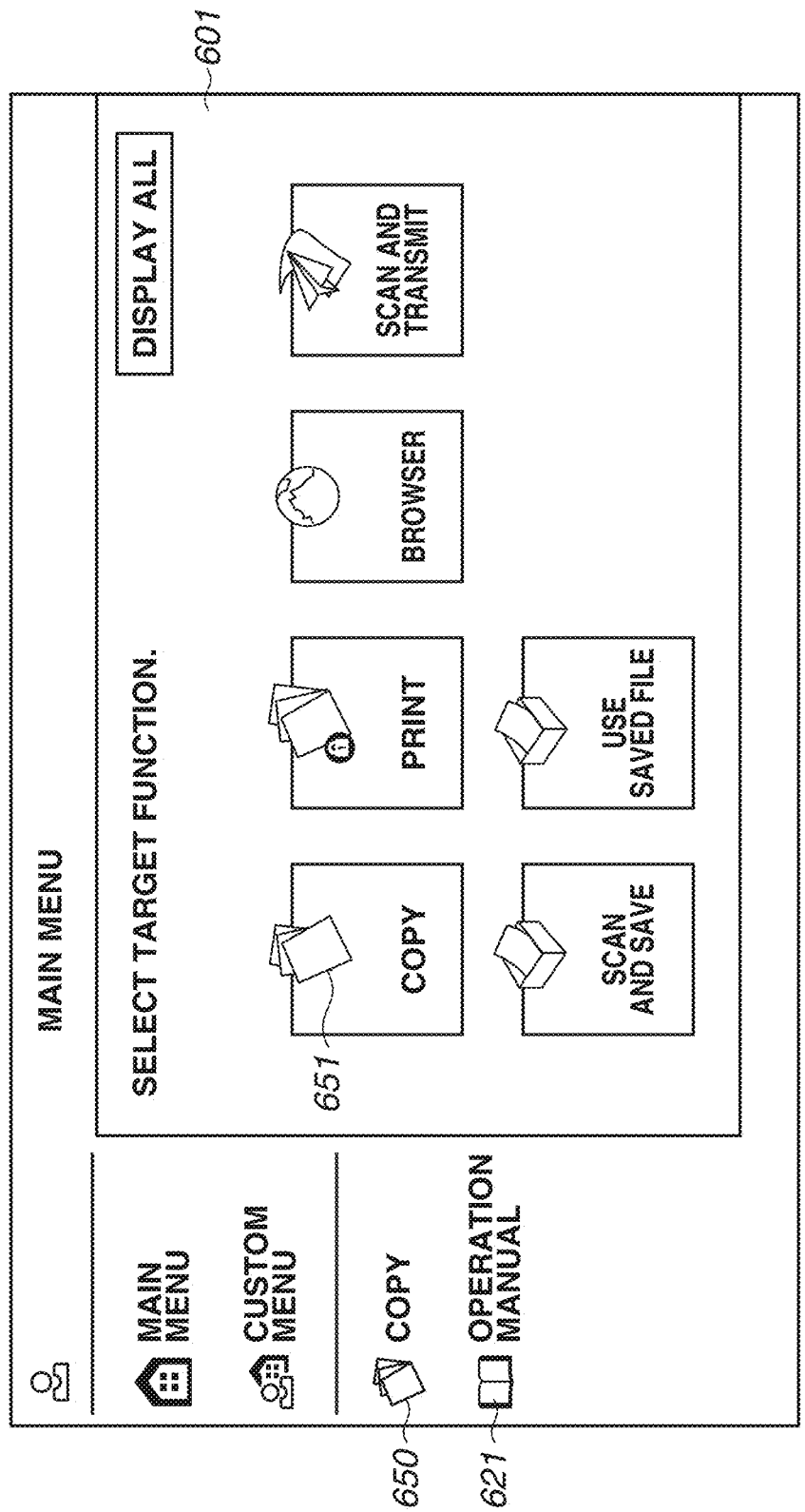

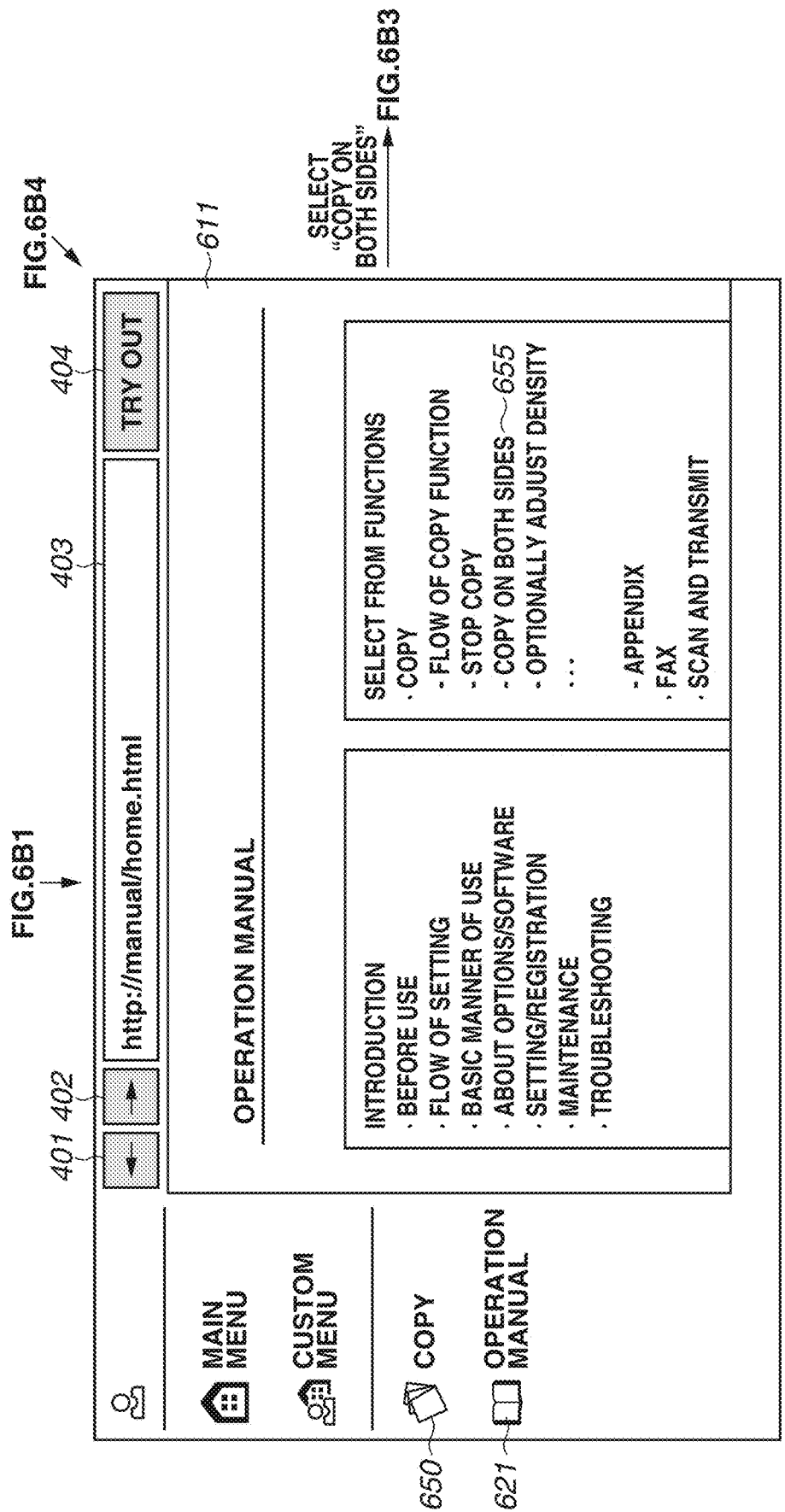

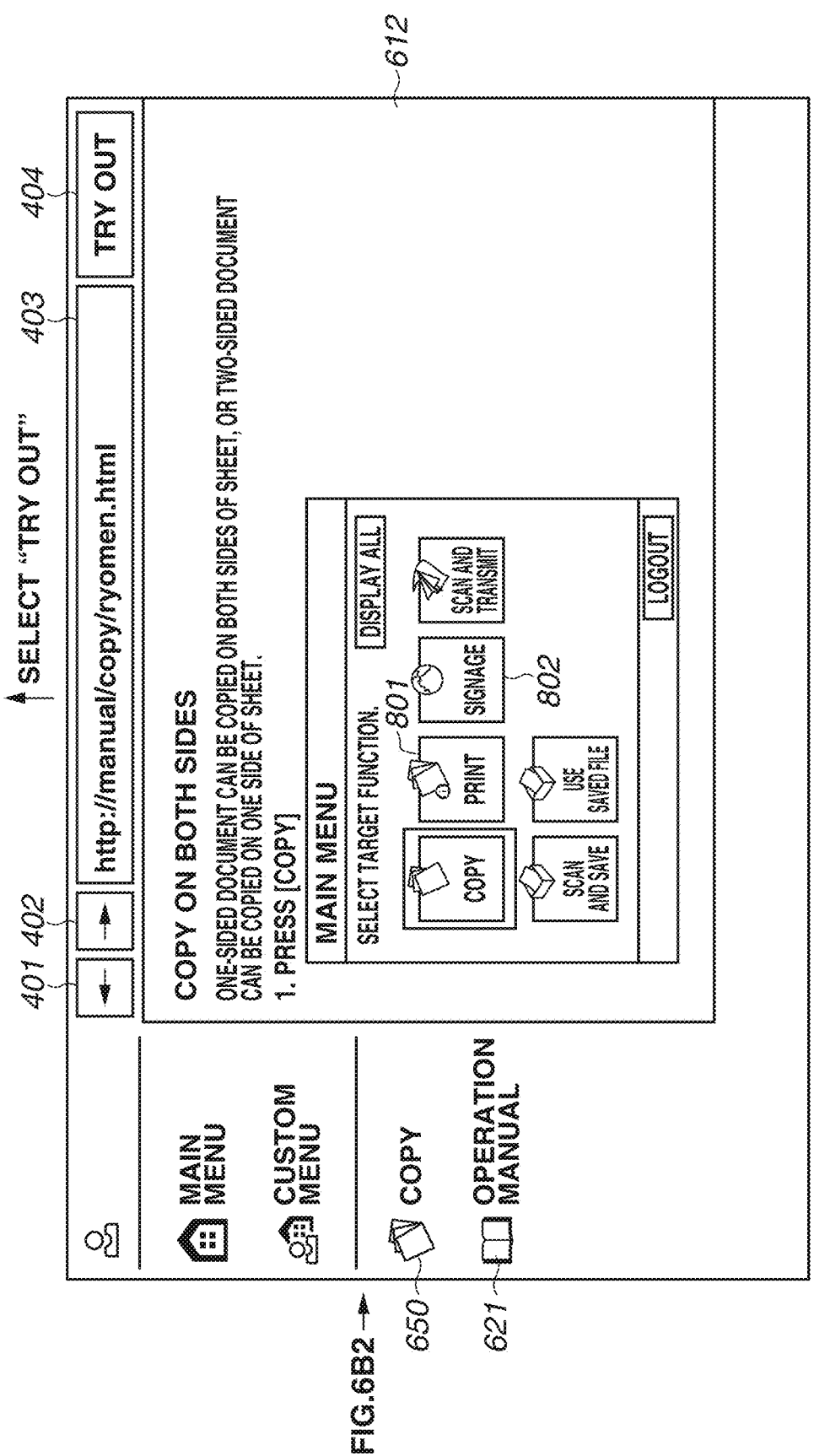

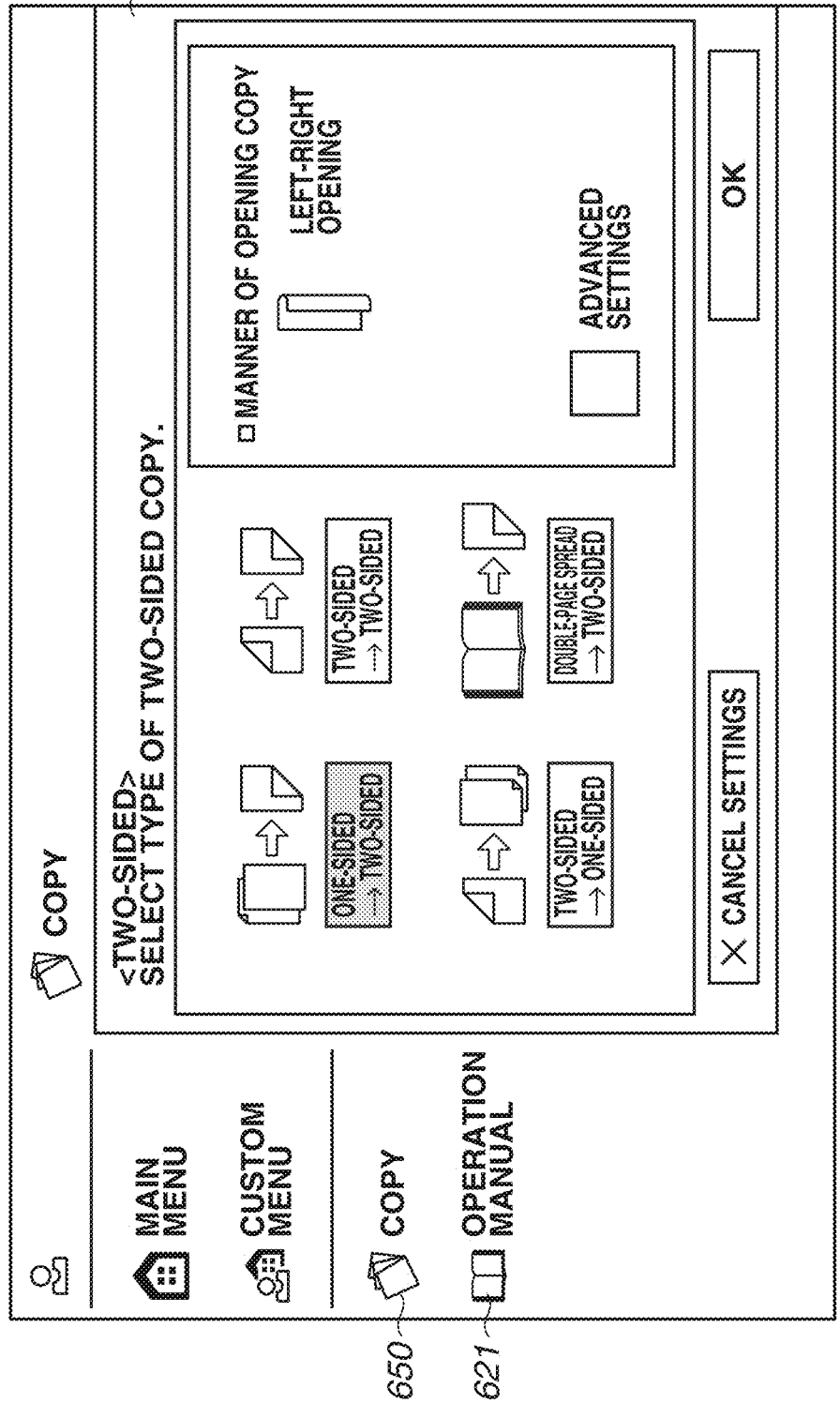

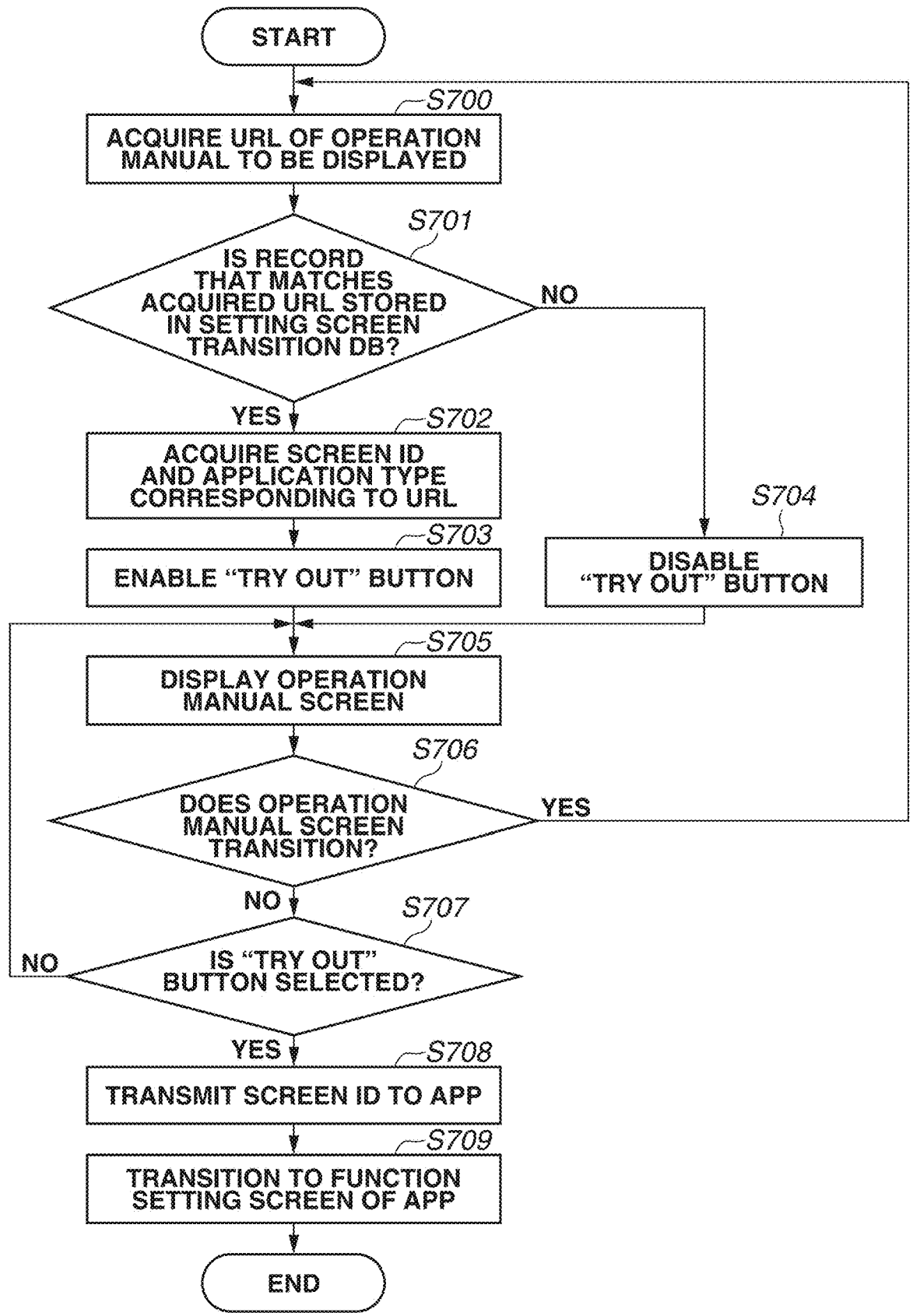

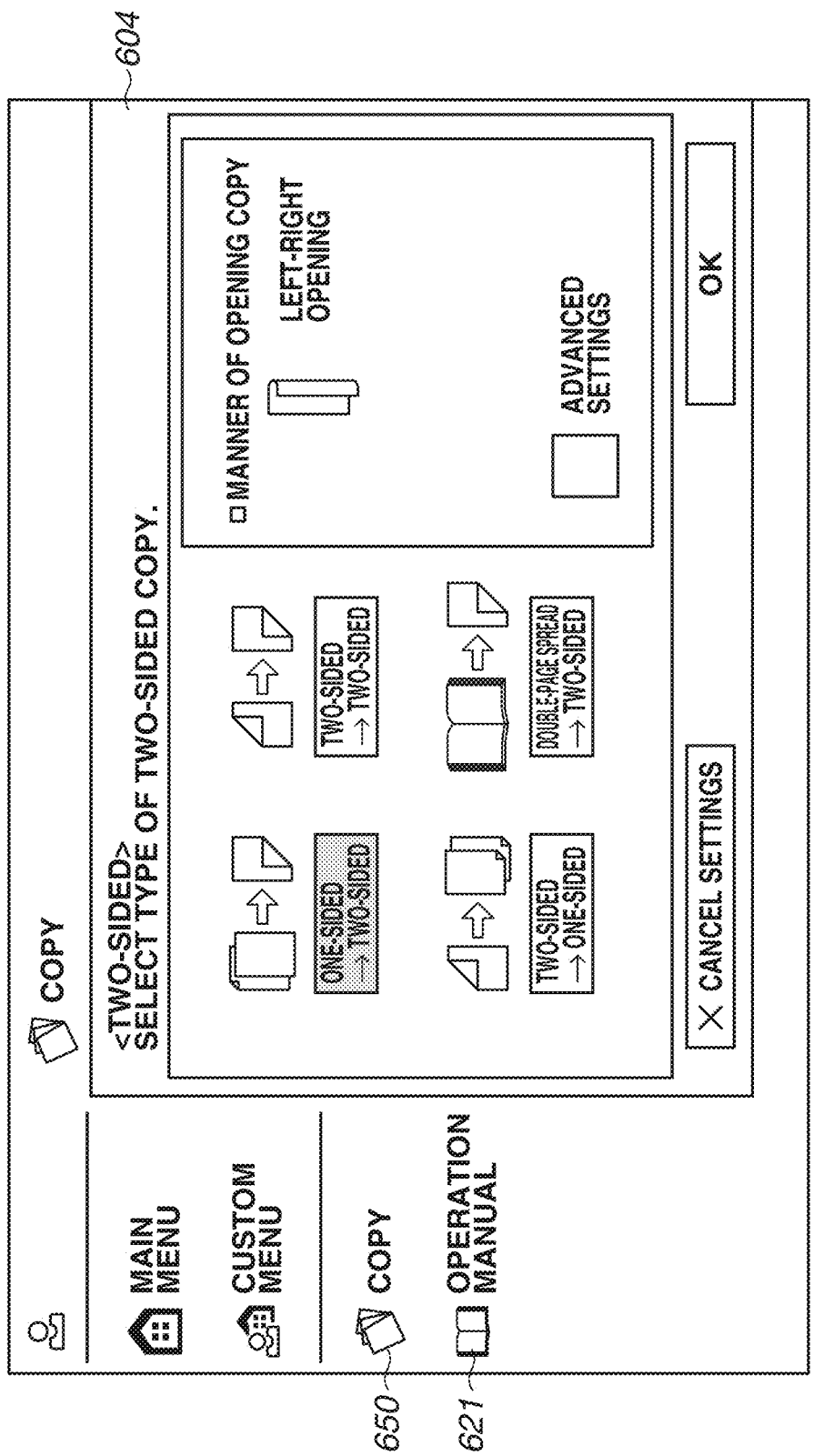

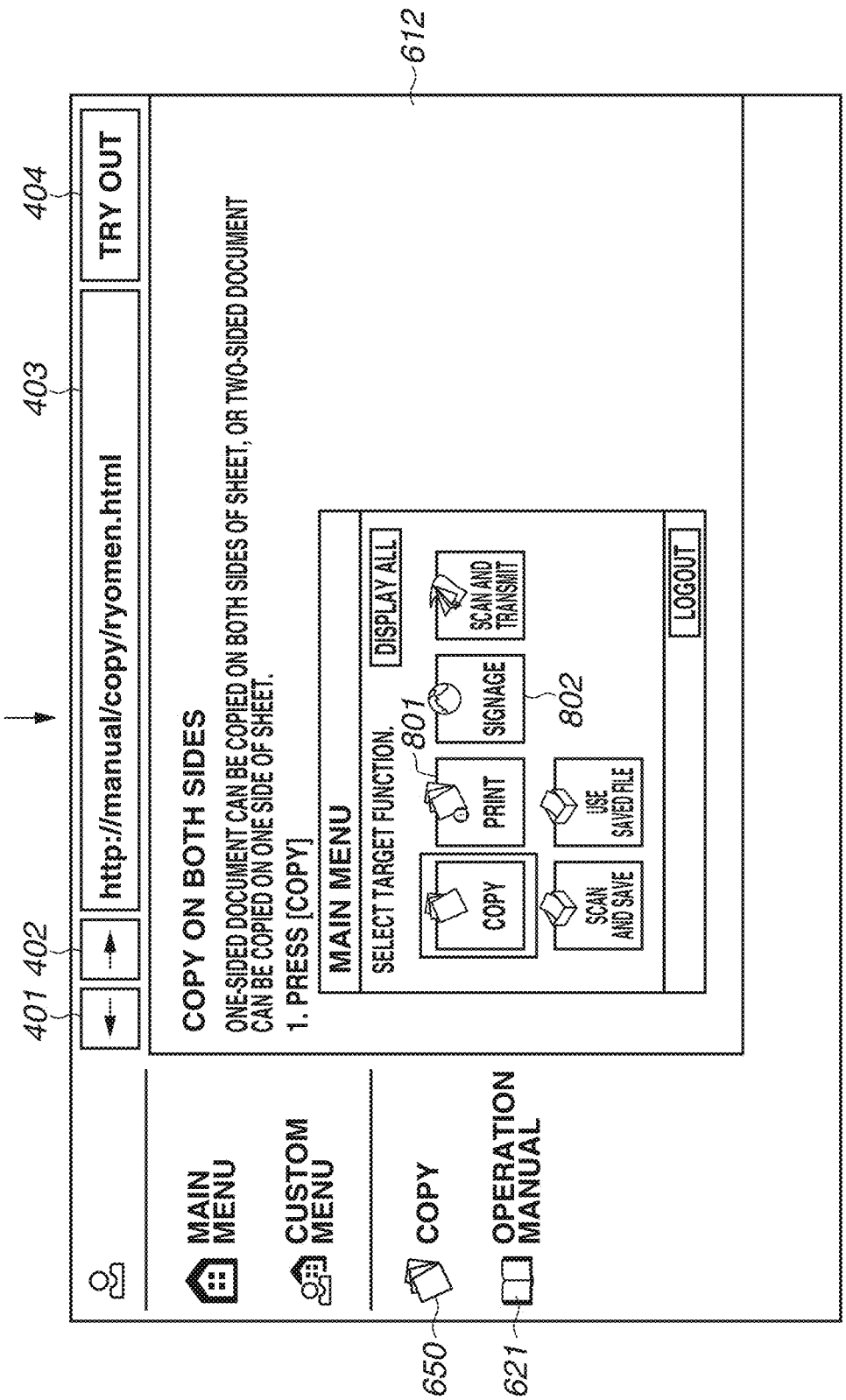

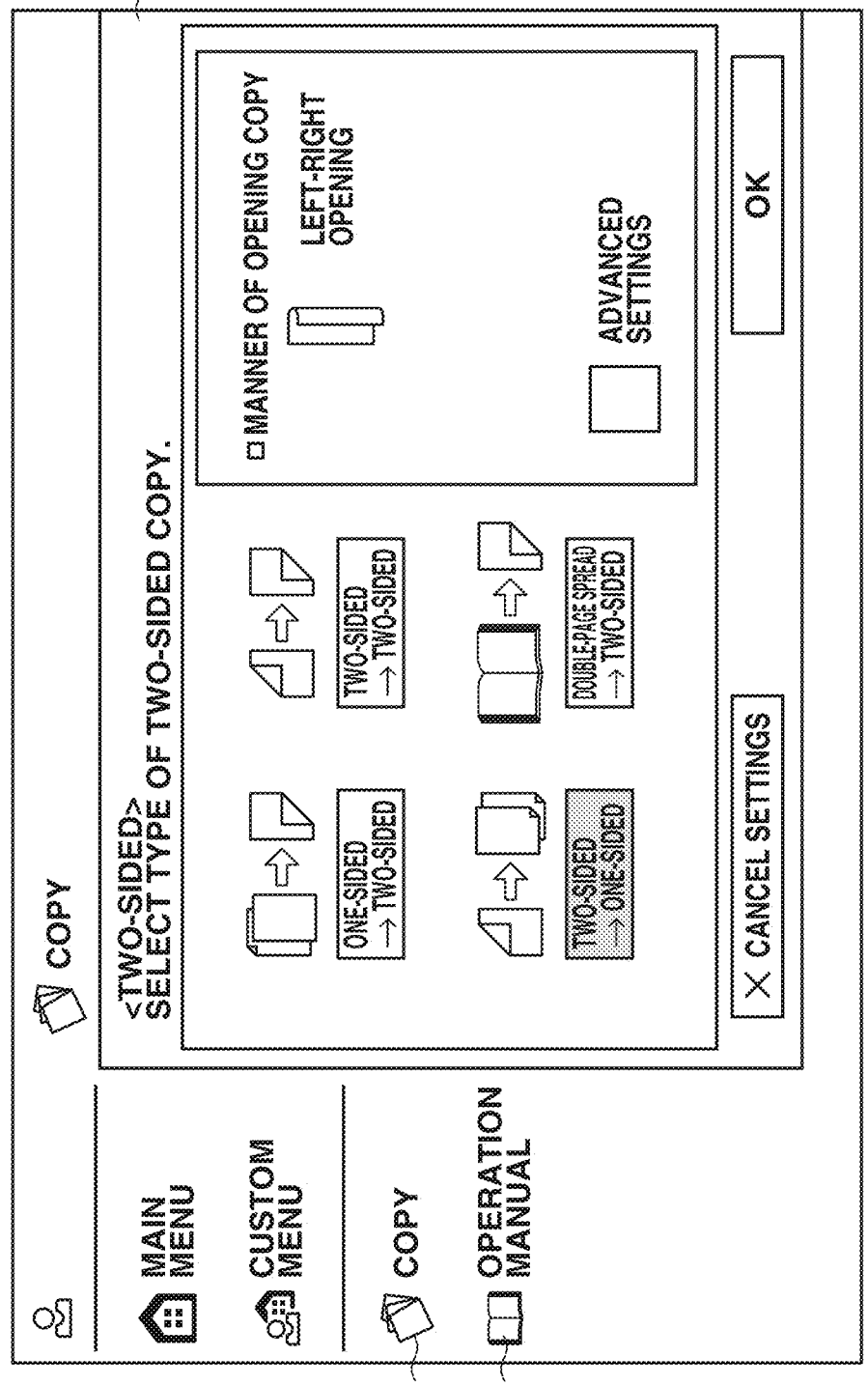

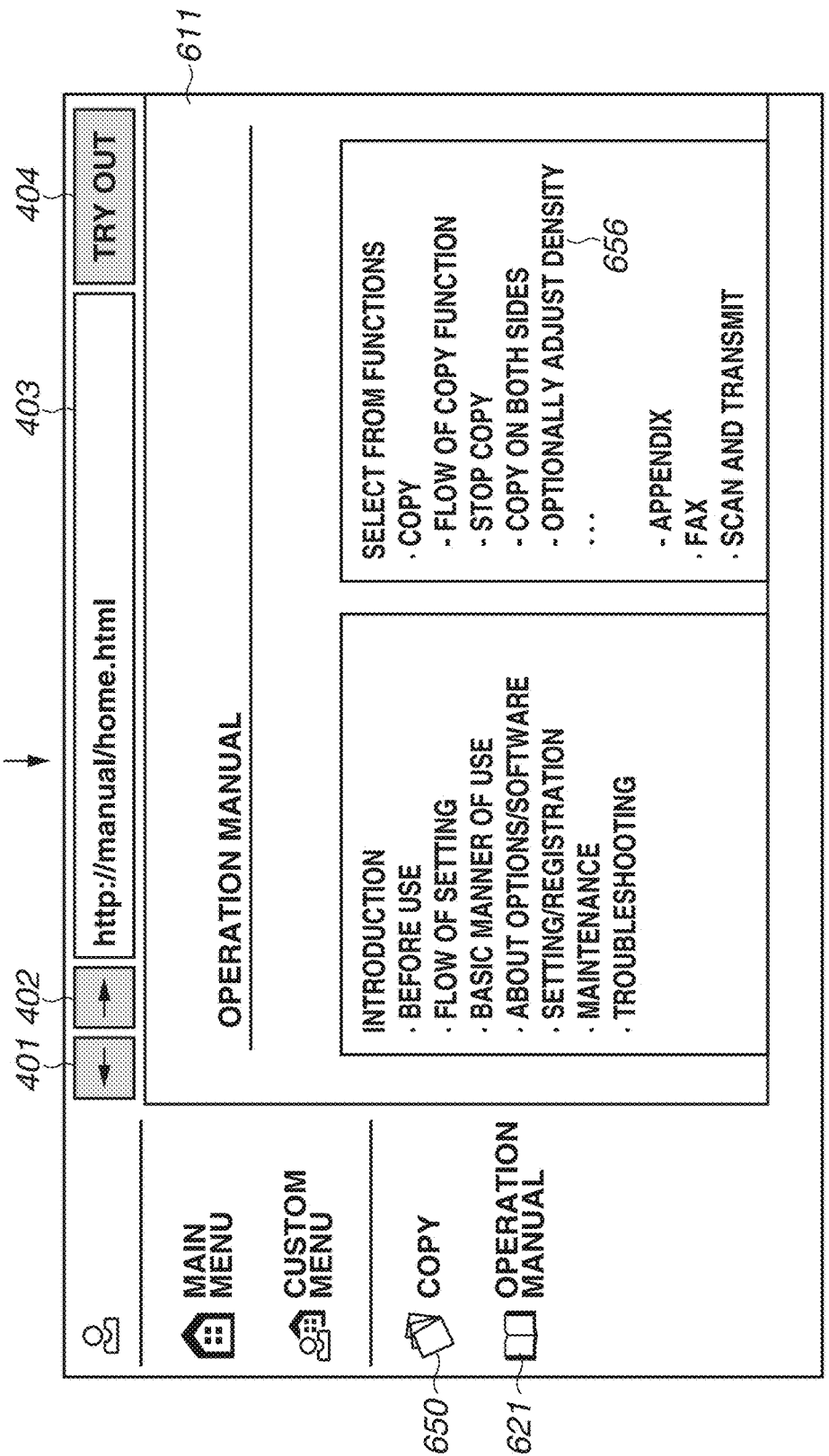

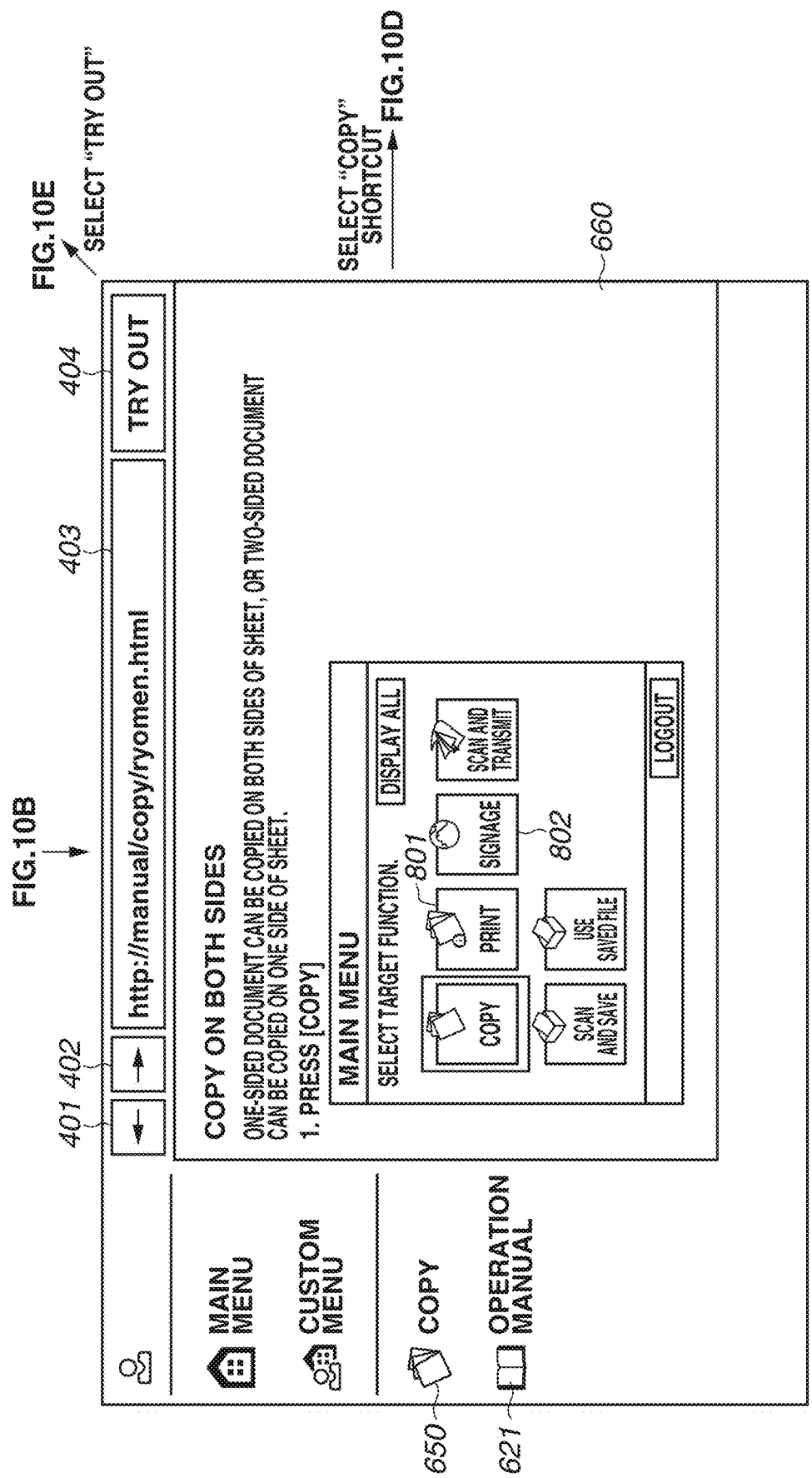

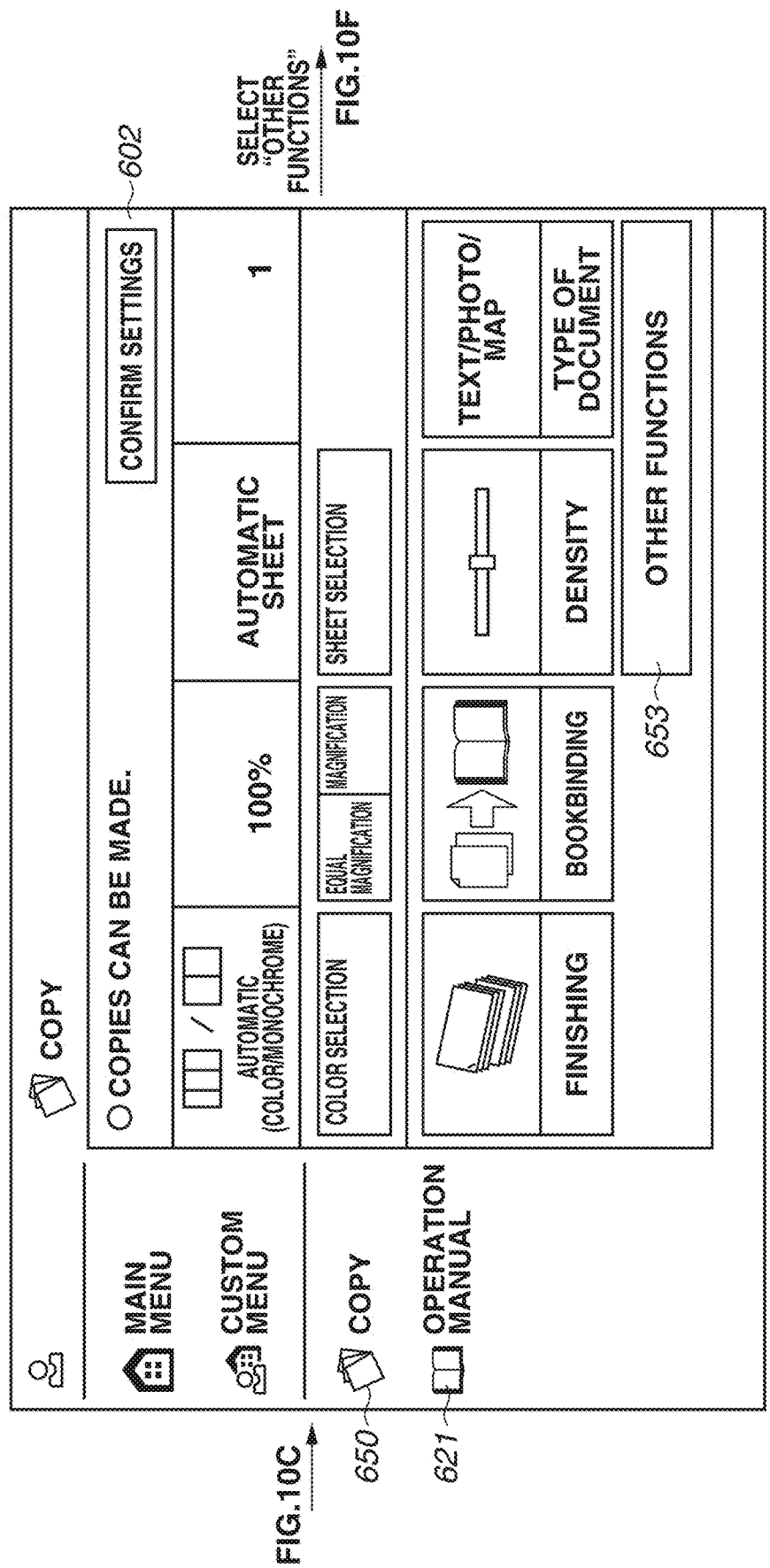

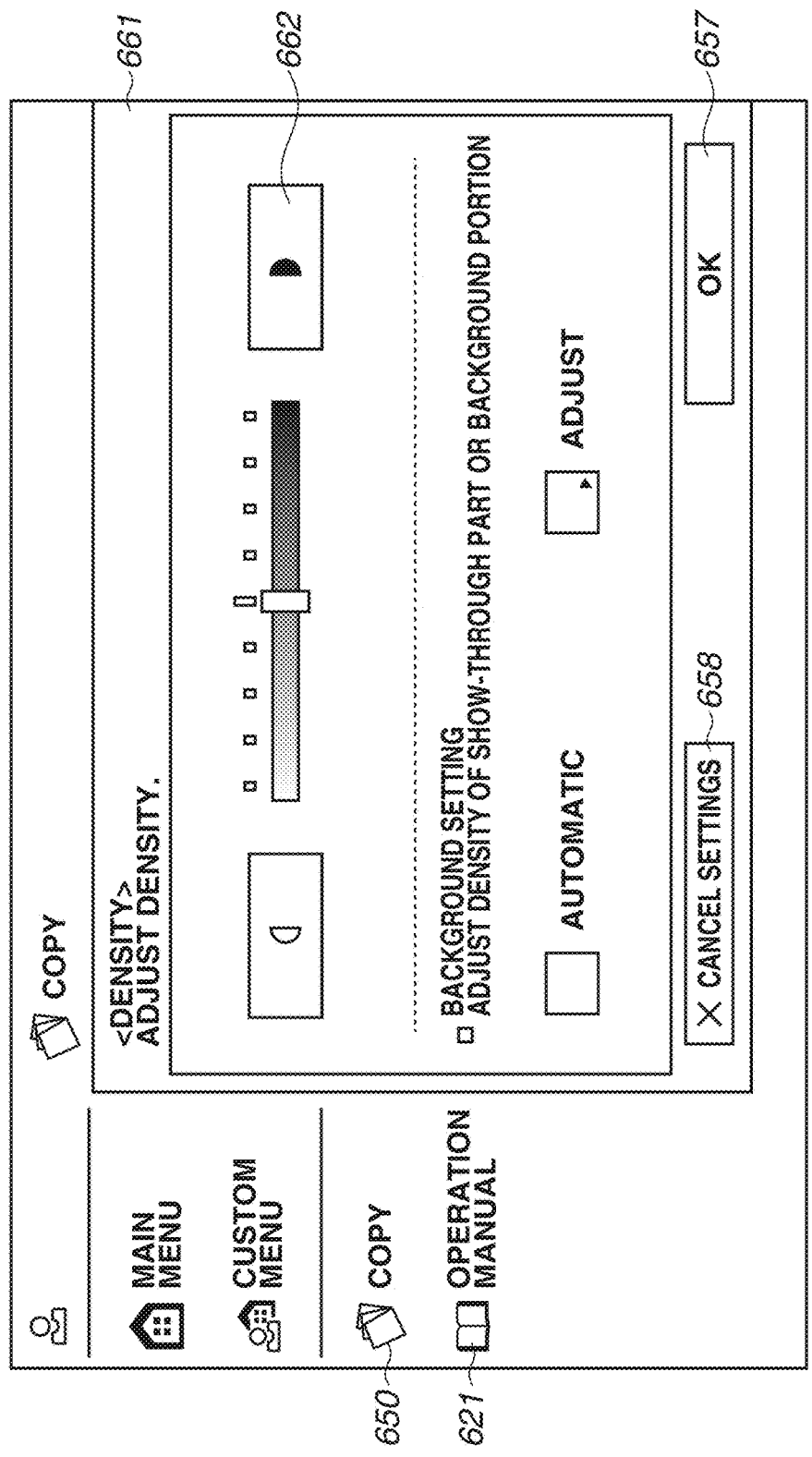

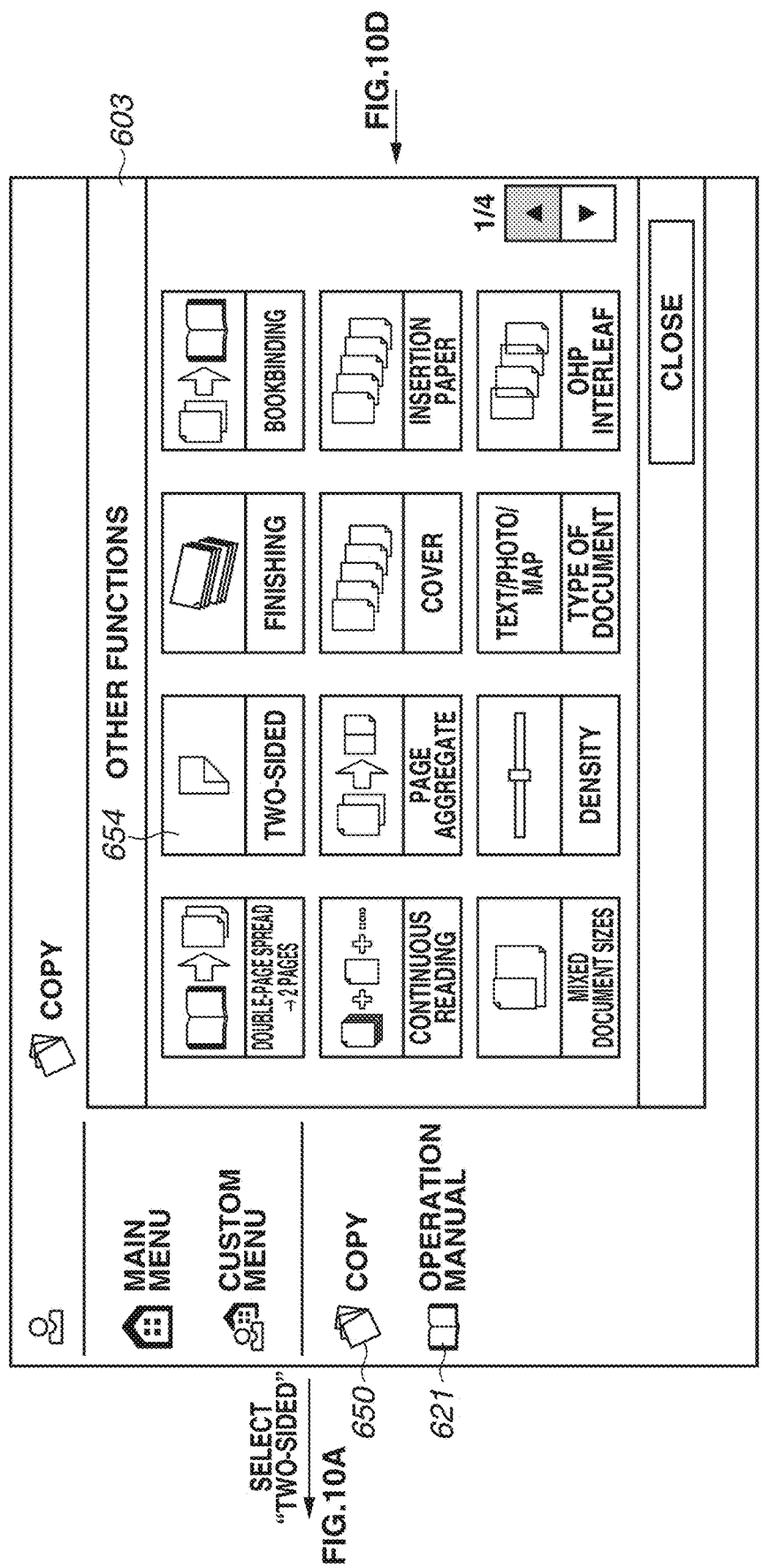

FIG.12

```
<?xml version="1.0" encoding="UTF-8"?>
1201 — <app type="copy">
1202 —     <set id="two_sided_original">true</set>
           <set id="two_sided_print">true</set>
           <set id="original_type">text_photo_original</set>

•
              •
              •

</app>
```

IMAGE PROCESSING APPARATUS, CONTROL METHOD FOR CONTROLLING THE SAME, AND RECORDING MEDIUM

BACKGROUND

Field

The present disclosure relates to an image processing apparatus, a control method for controlling the image processing apparatus, and a recording medium.

Description of the Related Art

An operation manual of an image forming apparatus is typically built into the image forming apparatus. Thus, to revise the operation manual for multiple image forming apparatuses, it is necessary to update the operation manual with respect to each individual apparatus. Alternatively, the operation manual is published on a web server external to the image forming apparatus, and a user accesses the web server via a web browser, thereby referencing the operation manual of the image forming apparatus. Consequently, the revision of the operation manual can be completed by merely revising the operation manual on the web server.

The operation manual on the web server can also be displayed and viewed on an external apparatus such as a personal computer (PC). For example, Japanese Patent Application Laid-Open No. 2015-118437 discusses a method for displaying an operation manual on an external apparatus and selecting a function or a setting item in the operation manual, thereby displaying on an operation unit of the external apparatus an operation screen for setting the selected function or item in an image forming apparatus.

There are some issues with the above-described conventional art. For example, in a case where a user sets a selected function or item in an operation unit of an image forming apparatus by operating an operation manual displayed on an external apparatus, it takes time and effort for the user to move back and forth between the external apparatus and the image forming apparatus depending on the respective positions of the apparatuses.

Even if the external apparatus and the operation unit of the image forming apparatus are at positions physically close to each other, the user typically needs to change the user's line of sight many times.

Since an image processing apparatus typically has a smaller area of a display unit and a smaller capacity of a storage device than those of a personal computer (PC), for example, a method for presenting an operation manual and a method for setting a function are restricted. Thus, these methods need to be improved.

SUMMARY

According to an aspect of the present disclosure, an image processing apparatus having a web browser function includes a display control unit configured to display, in a predetermined display region on an operation unit, an operation manual of the image processing apparatus that is composed of a web page, and a storage unit configured to store an identifier for accessing a web page of the operation manual and a screen provided by an application included in the image processing apparatus, wherein based on an identifier corresponding to a web page displayed on the operation unit and the screen, the display control unit displays on the operation unit a display item for transitioning to a screen of a function provided by the application included in the image processing apparatus.

Further features will become apparent from the following description of exemplary embodiments with reference to the attached drawings.

BRIEF DESCRIPTION OF THE DRAWINGS

FIGS. 6A1 to 6A4 and FIGS. 6B1 to 6B4 are diagrams illustrating examples of flows of screens of an operation display unit according to a first exemplary embodiment.

FIG. 7 is a flowchart illustrating a processing procedure according to the first exemplary embodiment.

FIGS. 8A and 8B are diagrams illustrating an example of a flow of screens of an operation display unit according to a second exemplary embodiment.

FIGS. 10A to 10F are diagrams illustrating an example of a flow of screens of an operation display unit according to a third exemplary embodiment.

FIG. 12 is a diagram illustrating an example of a structure of a temporary setting file according to the third exemplary embodiment.

DESCRIPTION OF THE EMBODIMENTS

Exemplary embodiments of the present disclosure are made in view of the above-described issues. Exemplary embodiments of the present disclosure are directed to providing a mechanism for enhancing convenience when an operation manual is viewed using an operation unit of an image processing apparatus. Exemplary embodiments of the present disclosure are also directed to providing a simple mechanism for causing an operation manual composed of a web page to transition from a displayed state to an application corresponding to the operation manual.

According to the exemplary embodiments of the present disclosure, a user can view an operation screen and an operation manual by merely paying attention to an operation unit of an image processing apparatus. On the operation screen, the operation manual can transition to a function setting screen of a desired application. This contributes to the simplification and the efficiency of work.

Exemplary embodiments for carrying out the present disclosure will be described below with reference to the drawings.

Figure 1:
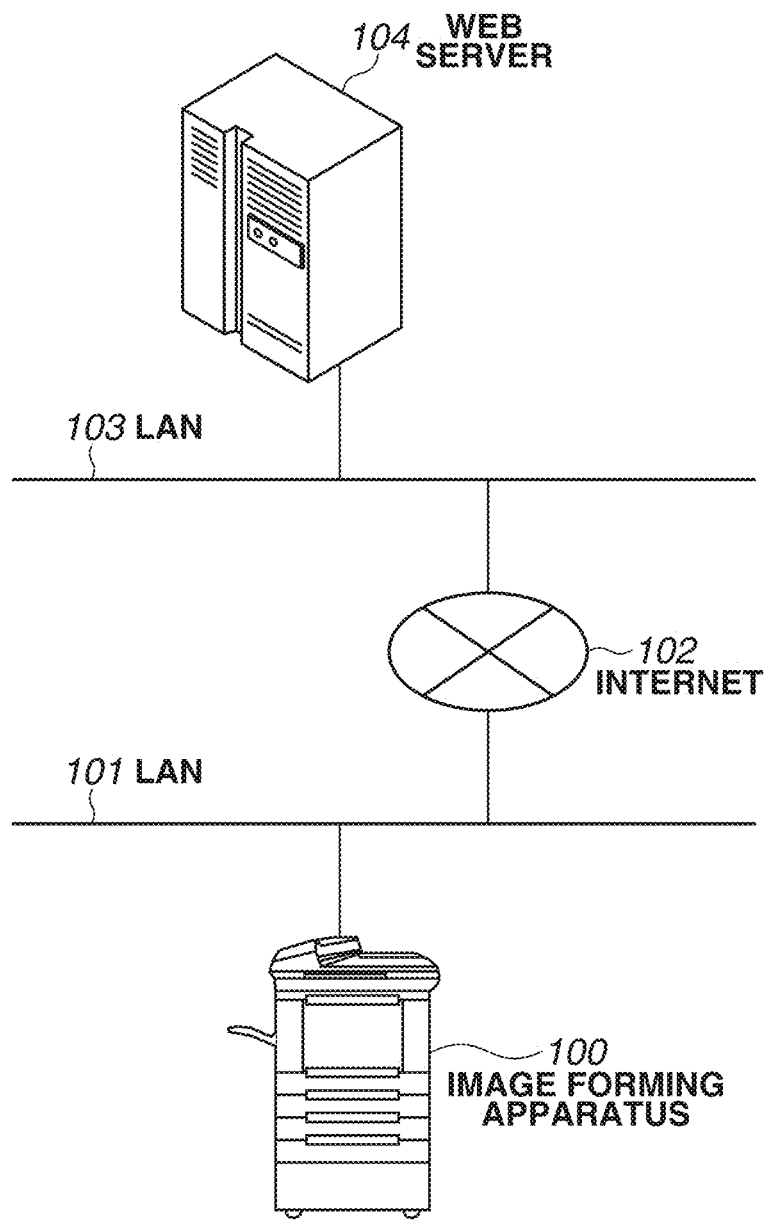
FIG. 1 is a diagram illustrating an entirety of an information processing system according to exemplary embodiments.

FIG. 1 is a diagram illustrating the overall configuration of a system including an information processing apparatus according to the exemplary embodiments.

In the present system, an image forming apparatus 100 is connected to the Internet 102 via a local area network (LAN) 101. A web server 104 stores an operation manual and is connected to the Internet 102 via a LAN 103. The image forming apparatus 100 can acquire the operation manual from the web server 104 via the Internet 102. In this case, an example is described where a single image forming apparatus 100 and a single web server 104 are provided. Alternatively, a plurality of image forming apparatuses 100 and a plurality of web servers 104 can be provided. The configuration can be such that the operation manual is stored in the image forming apparatus 100 instead of in the web server 104, and the operation manual is acquired and displayed within the image forming apparatus 100.

Figure 2:
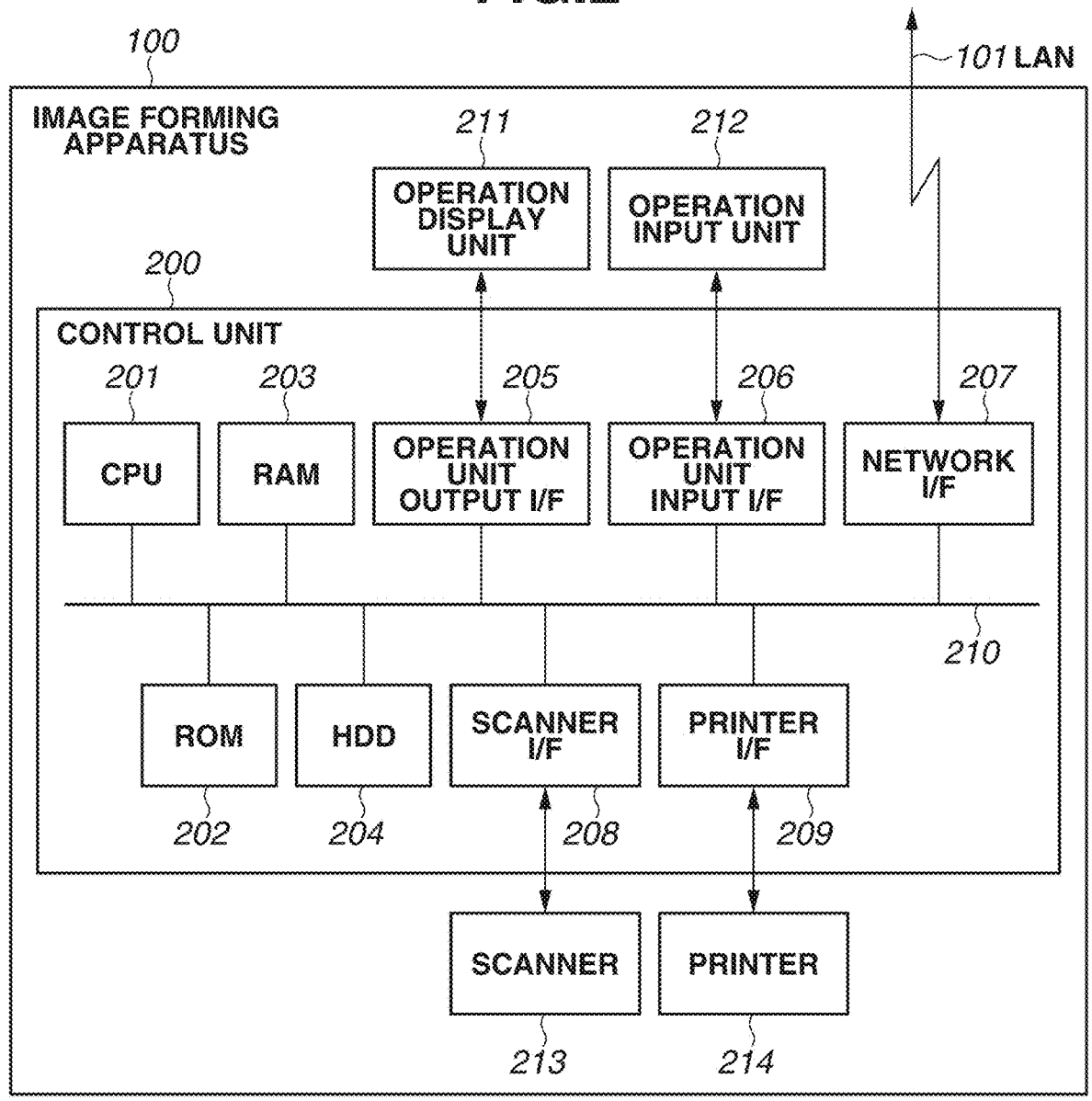
FIG. 2 is a block diagram illustrating a hardware configuration of an image processing apparatus according to the exemplary embodiments.

FIG. 2 is a block diagram illustrating the configuration of the image forming apparatus 100 according to the exemplary embodiments.

A control unit 200, which includes a central processing unit (CPU) 201, controls the operation of the image forming apparatus 100. The CPU 201 reads a control program stored in a read-only memory (ROM) 202, and performs various types of control such as reading control and transmission control. The ROM 202 is a boot ROM and stores a boot program for the system. A random-access memory (RAM) 203 is used as a temporary storage area such as a main memory or a work area for the CPU 201. A hard disk drive (HDD) 204 stores image data, various programs, various information tables, or various information files. The HDD 204 can also store data acquired external from the apparatus via a network interface (I/F) 207.

An operation unit output IT 205 controls communication for the output of data to an operation display unit 211. The operation display unit 211 is a display interface for a user, which includes a display device such as a liquid crystal display (LCD) device or a light-emitting diode (LED) device. An operation unit input I/F 206 controls communication for the input of data from an operation input unit 212. The operation input unit 212 is an interface to which an instruction from the user is input and that includes an input device such as a touch panel or a hardware key.

The network IT 207 is an interface for connecting the control unit 200 to the LAN 101. The network I/F 207 transmits or receives information to or from an external apparatus connected to the Internet 102 via the LAN 101.

A scanner IT 208 is an interface for connecting a scanner 213 and the control unit 200. The scanner 213 reads an image on an original document, generates image data, and inputs the image data to the control unit 200 via the scanner IT 208.

A printer I/F 209 is an interface for connecting a printer 214 and the control unit 200. The printer 214 prints, on a printing medium, image data to be printed that is transferred from the control unit 200 to the printer 214 via the printer I/F 209.

The above devices 201 to 209 are connected to a system bus 210.

Figure 3:
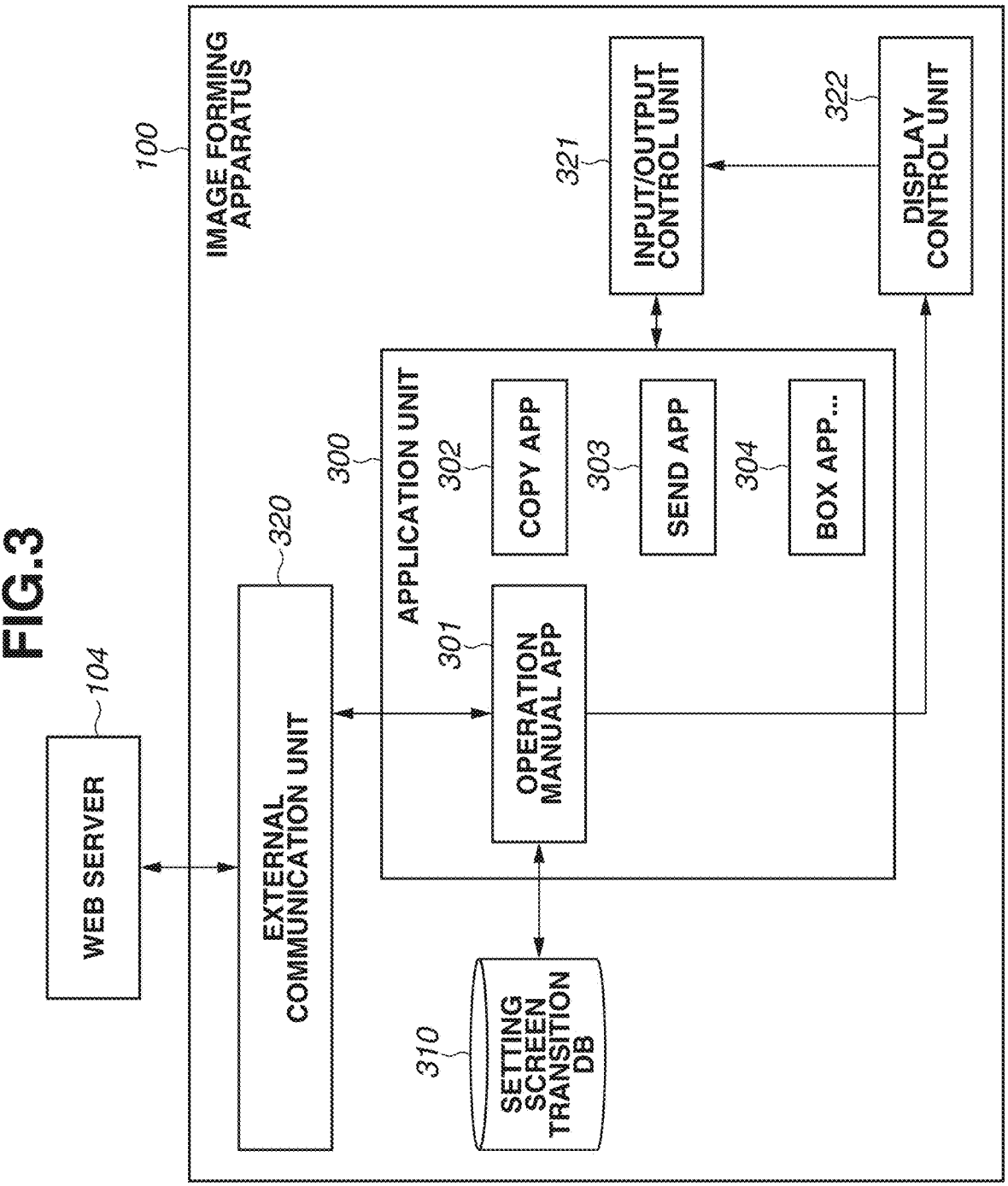
FIG. 3 is a block diagram illustrating a software configuration of the image processing apparatus according to the exemplary embodiments.

FIG. 3 is a diagram illustrating the software configuration of the above-described system.

Function units illustrated in FIG. 3 are achieved by the CPU 201 in the image forming apparatus 100 reading and executing a control program stored in the ROM 202 or in the HDD 204.

The image forming apparatus 100 includes an external communication unit 320, an application unit 300, a setting screen transition database (DB) 310, an input/output control unit 321, and a display control unit 322.

The external communication unit 320 performs communication so that an operation manual app 301 of the application unit 300 receives a web service of the web server 104. Specifically, via the external communication unit 320, a request message is transmitted to the web server 104, which provides a web service to the operation manual app 301, and a response message is also transmitted from the web server 104. The response message received by the operation manual app 301 is displayed on a screen of the operation manual app 301. Using these web services of applications, the operation manual app 301 can display the operation manual stored in the web server 104.

The application unit 300 includes applications such as the operation manual app 301, a copy app 302, a send app 303, and a box app 304. The operation manual app 301 displays an operation manual screen, manages the state of a "try out" button 404 (described below), and instructs the display control unit 322 to output a screen.

In the setting screen transition DB 310, a management table (described below) including a Uniform Resource Locator (URL) 501, a screen identification (ID) 502, and an application type 503 is stored.

Figure 4:
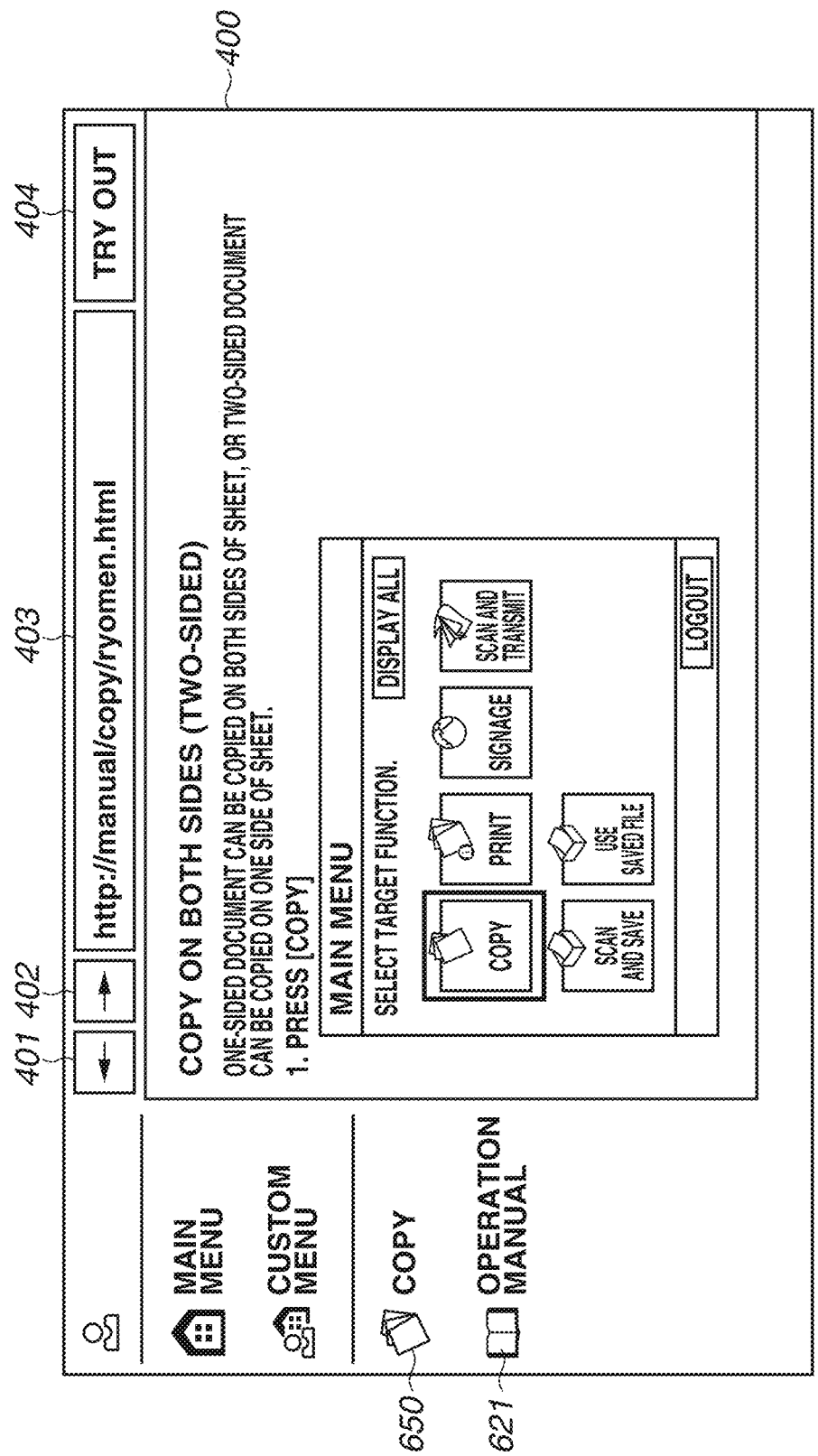
FIG. 4 is a diagram illustrating an example of a screen of an operation manual app 301 according to the exemplary embodiments.

FIG. 4 is an example of a screen of the operation manual app 301.

The operation manual app 301 includes an operation manual display portion 400, a "back" button 401, a "forward" button 402, a URL display portion 403, and a "try out" button 404 as graphical user interface (GUI) components.

The operation manual display portion 400 displays the operation manual. Specifically, the operation manual app 301 contains web browser components and displays a screen via a web browser.

When the operation manual app 301 starts, the web browser acquires the stored URL of a main page of the operation manual and transmits the URL of the main page of the operation manual as a request message to the web server 104. Then, the web browser acquires a response from the web server 104 and displays the operation manual. The URL of the main page of the operation manual is stored in advance in the ROM 202, in the RAM 203, or in the HDD 204. In a case where the displayed screen includes a link to another page, and if the user selects the link, the web browser displays the linked page. At this time, the web browser temporarily stores the URL of the displayed screen in the RAM 203 or the HDD 204. Alternatively, if the displayed screen transitions to another page, the web browser can discard the temporarily stored URL.

The "back" button 401 has the function of displaying a screen displayed immediately before the current screen. The "forward" button 402 has the function of, in the state where the "back" button 401 is selected once or more, displaying a screen displayed immediately after the current screen. If no screen exists immediately before the current screen, the "back" button 401 is grayed out and disabled. If no screen exists immediately after the current screen, the "forward" button 402 is grayed out and disabled.

The URL display portion 403 displays the URL of the operation manual that is being displayed.

The "try out" button 404 is a display item for transitioning to a function setting screen of an application corresponding to the operation manual that is being displayed. Specifically, first, the operation manual app 301 acquires the URL of the operation manual that is being displayed on a web browser component. Next, the operation manual app 301 determines whether the acquired URL is registered in a management table of the setting screen transition DB 310. If the acquired URL is registered, the operation manual app 301 enables the "try out" button 404 and acquires the screen ID 502 and the application type 503, both of which are described below, corresponding to the URL of the operation manual that is being displayed. If the acquired URL is not registered, the operation manual app 301 displays the "try out" button 404 in a grayed-out state. The image forming apparatus 100 performs control so that, even if a button in a grayed-out state is selected by a user operation, the screen does not transition.

If the user selects the "try out" button 404, then based on the acquired application type 503, the operation manual app 301 specifies to which application the operation manual corresponds. Then, the operation manual app 301 transmits the screen ID 502 to the specified application. The application to which the screen ID 502 is transmitted displays a screen corresponding to the screen ID 502.

The operation manual app 301 transmits the acquired application type 503 to the display control unit 322. The display control unit 322 receives the application type 503 transmitted from the operation manual app 301, and instructs the input/output control unit 321 to display the application corresponding to the received application type 503 on an operation unit. The input/output control unit 321 displays, on the operation display unit 211 via the operation unit output I/F 205, the screen corresponding to the application that the input/output control unit 321 is instructed to display.

The input/output control unit 321 also has the function of transmitting an input value input from the operation input unit 212 via the operation unit input I/F 206 to the application unit 300. The setting screen transition DB 310 is a management table for managing the URL 501, the screen ID 502, and the application type 503, and is stored in the HDD 204.

Figure 5:
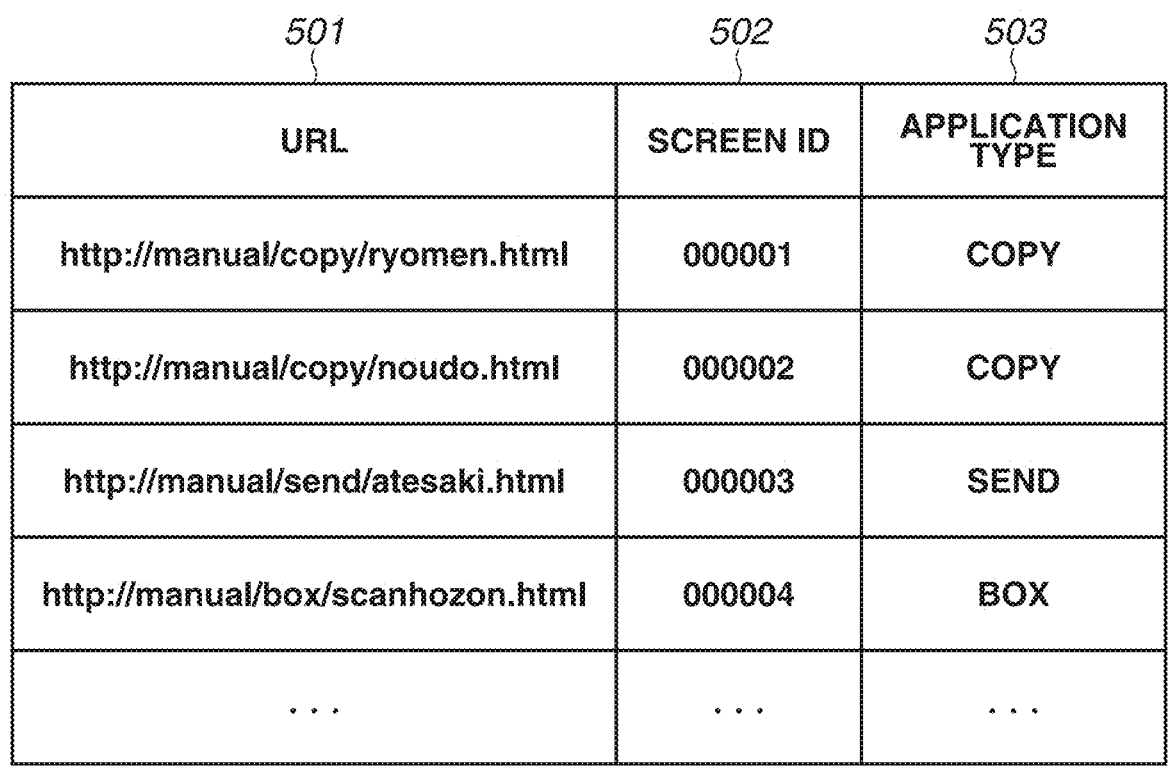
FIG. 5 is a diagram illustrating an example of a management table of a setting screen transition database (DB) 310 according to the exemplary embodiments.

FIG. 5 is a diagram sample of the URL 501, the screen ID 502, and the application type 503 in the setting screen transition DB 310.

The URL 501 is the URL where the operation manual is stored. The URL 501 functions as an identifier for specifying a web page of the operation manual. The screen ID 502 indicates the ID of a screen assigned to a function setting screen of an application such as the copy app 302 or the send app 303. The screen ID 502 functions as an identifier for specifying a screen to be displayed. The application type 503 indicates an application type associated with an application such as the copy app 302 or the send app 303. The application type 503 functions as an identifier for identifying an application.

Here, the URL 501, the screen ID 502, and the application type 503 correspond to each other in each row of the management table.

An application such as the copy app 302, the send app 303, or the box app 304 provides the function of performing image processing in the CPU 201 using the scanner 213 or the printer 214. These applications generate setting screens for their respective functions. Other applications also exist in the application unit 300, but they are not described.

FIGS. 6A1 to 6A4 and FIGS. 6B1 to 6B4 are diagrams illustrating a first exemplary embodiment. These are examples of screens of the operation manual app 301 when transitioning to a two-sided copying setting screen 604 (described below) of the copy application 302.

FIGS. 6A1 to 6A4 describe an example of a transition flow to the two-sided copying setting screen 604 via a copy main screen 602.

On a main menu screen 601 (FIG. 6A1), if the user selects a "copy" button 651 (or a "copy" shortcut 650), a copy main screen 602 (FIG. 6A2) is displayed.

The copy main screen 602 is a setting screen where copy settings can be changed. To change a setting that is not being displayed on the copy main screen 602, the user needs to select an "other functions" button 653. On the copy main screen 602, if the user selects the "other functions" button 653, a "copy/other functions" screen 603 (FIG. 6A3) is displayed.

On the "copy/other functions" screen 603, if a "two-sided" button 654 is selected, the two-sided copying setting screen 604 (FIG. 6A4) is displayed.

FIGS. 6B1 to 6B4 describe an example of a transition flow to the two-sided copying setting screen 604 by the operation manual app 301. In this case, the URL 501, the screen ID 502, and the application type 503 illustrated in FIG. 5 are used for the description.

On the main menu screen 601 (FIG. 6B1), if the user selects an "operation manual" shortcut 621, an operation manual screen 611 (FIG. 6B2) is displayed.

The operation manual screen 611 displays the main page of the operation manual. On the main page of the operation manual, a URL in the URL display portion 403 does not correspond to the URL 501. Thus, the "try out" button 404 is disabled in a grayed-out state. On the operation manual screen 611, if the user selects "copy on both sides" 655, a two-sided copy operation manual screen 612 (FIG. 6B3) is displayed.

On the two-sided copy operation manual screen 612, a URL in the URL display portion 403 corresponds to the URL 501. Thus, the "try out" button 404 is enabled. In this state, if the user selects the "try out" button 404, the two-sided copying setting screen 604 (FIG. 6B4) is displayed.

On the two-sided copying setting screen 604, an initial value of the copy app 302 is set, and a set item is colored or is displayed so that it is understood that the set item is in a selected state. The initial value of each application is managed and stored in the RAM 203.

As described above, the operation manual app 301 can transition to the two-sided copying setting screen 604 by a method different from that in a case where the operation manual app 301 transitions to the two-sided copying setting screen 604 via the copy main screen 602. On the two-sided copying setting screen 604 (FIG. 6B4), if the user selects the "operation manual" shortcut 621, the operation manual screen 611 (FIG. 6B2) is displayed.

FIG. 7 is a flowchart illustrating the processing of the operation manual app 301 executed by the CPU 201 in the first exemplary embodiment. The processing in FIG. 7 starts when the user selects the "operation manual" shortcut 621 displayed on the main menu screen 601 in FIG. 6B1.

In step S700, when the operation manual app 301 starts, the operation manual app 301 acquires the URL of the operation manual to be displayed on a screen. Since the operation manual app 301 displays the main page of the operation manual when the operation manual app 301 starts, the operation manual app 301 acquires the URL of the main page of the operation manual stored in the ROM 202 or in the HDD 204. In a case other than a case where the operation manual app 301 starts, the user selects a link embedded in the operation manual, whereby the operation manual app 301 acquires the URL of the selected link.

In step S701, the operation manual app 301 determines whether a record that matches the acquired URL is stored in the setting screen transition DB 310. Specifically, the operation manual app 301 compares the character strings of a URL in the setting screen transition DB 310 and the acquired URL. If the character strings match each other, it is determined that a record that matches the acquired URL is stored (Yes in step S701), and the processing proceeds to step S702. If the operation manual app 301 compares the acquired URL with URLs in all the rows, and the acquired URL does not match any of the URLs, it is determined that a record that matches the acquired URL is not stored (No in step S701), and the processing proceeds to step S704.

In step S702, the operation manual app 301 acquires the screen ID 502 and the application type 503 corresponding to the acquired URL.

In step S703, the operation manual app 301 enables the "try out" button 404.

In step S704, the operation manual app 301 disables the "try out" button 404.

In step S705, the operation manual app 301 displays the operation manual screen 611 (see FIG. 6B2).

In step S706, the operation manual app 301 determines whether the operation manual screen 611 transitions. Specifically, the operation manual app 301 detects whether the user selects a link embedded in the operation manual screen 611.

In step S707, the operation manual app 301 detects whether the user selects the "try out" button 404. If the "try out" button 404 is not selected (No in step S707), the processing proceeds to step S705. If the "try out" button 404 is selected (Yes in step S707), the processing proceeds to step S708.

In step S708, the operation manual app 301 transmits the screen ID 502 to an application corresponding to the acquired application type 503. The application to which the screen ID 502 is transmitted generates a screen corresponding to the screen ID 502.

In step S709, the operation manual app 301 transmits the acquired application type 503 to the display control unit 322. Based on the transmitted application type 503, the display control unit 322 instructs the input/output control unit 321 to display the screen of the application corresponding to the application type 503. The input/output control unit 321 displays, on the operation display unit 211 via the operation unit output I/F 205, the screen that the input/output control unit 321 is instructed to display.

As described above, according to the present exemplary embodiment, an operation manual screen for display on an operation unit of an image processing apparatus is generated. Then, by an operation on the operation manual screen, it is possible to display on an operation display unit of the image processing apparatus a function setting screen of an application corresponding to the content of the operation manual. This saves the user the trouble of moving back and forth between an apparatus displaying the operation manual and the operation unit of the image processing apparatus, or of shifting the user's eyes between the apparatuses.

Next, a second exemplary embodiment for carrying out the present disclosure is described mainly regarding the differences from the first exemplary embodiment. In the first exemplary embodiment, on a function setting screen of an application (the two-sided copying setting screen 604), if the user selects the "operation manual" shortcut 621, the function setting screen transitions to the main page of the operation manual (the operation manual screen 611). In the second exemplary embodiment, in a case where a function setting screen of an application transitions to the operation manual, the function setting screen transitions to a page of the operation manual corresponding to the screen ID 502 of the function setting screen of the application.

FIGS. 8A and 8B illustrate an example of the flow of screens for transitioning from the two-sided copying setting screen 604 of the copy application 302 to a page of the operation manual corresponding to the two-sided copying setting screen 604. The URL 501, the screen ID 502, and the application type 503 illustrated in FIG. 5 are used for the description.

On the two-sided copying setting screen 604 (FIG. 8A), if the user selects the "operation manual" shortcut 621, the two-sided copy operation manual screen 612 (FIG. 8B) is displayed.

On the two-sided copy operation manual screen 612, a URL in the URL display portion 403 corresponds to the URL 501. Thus, the "try out" button 404 is enabled. As described above, the screen can transition to a page of the operation manual corresponding to the two-sided copying setting screen 604.

In the second exemplary embodiment, the processing of the operation manual app 301 is different from that in FIG. 7 in the process of step S700.

Figure 9:
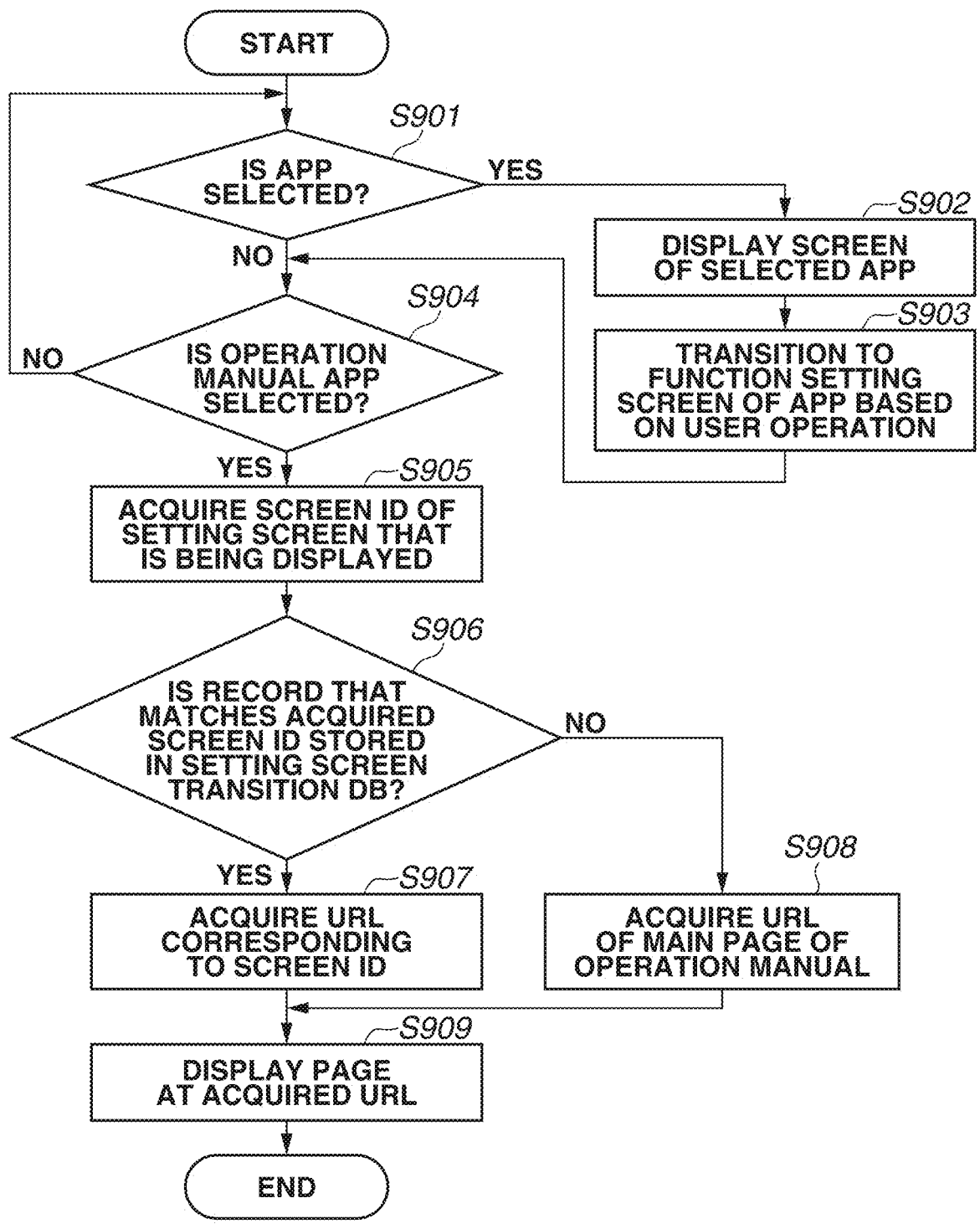
FIG. 9 is a flowchart illustrating a processing procedure according to the second exemplary embodiment.

FIG. 9 is a flowchart illustrating processing that replaces the process of step S700 in FIG. 7. FIG. 9 illustrates the processing of the operation manual app 301 executed by the CPU 201.

In step S901, the CPU 201 detects whether the user selects an application. If it is determined that the user selects an application (Yes in step S901), the processing proceeds to step S902. If it is determined that the user does not select an application (No in step S901), the processing proceeds to step S904.

In step S902, the CPU 201 displays, on the operation unit, the application selected by the user in step S901.

In step S903, based on a user operation, the CPU 201 transitions to a function setting screen of the application.

In step S904, the CPU 201 detects whether the user selects the operation manual app 301. If the user selects the operation manual app 301 (Yes in step S904), the processing proceeds to step S905. If it is determined that the user does not select the operation manual app 301 (No in step S904), the processing proceeds to step S901.

In step S905, the CPU 201 acquires, from the application that is being displayed, the screen ID 502 of the function setting screen of the application that is being displayed. The application manages a screen to be displayed based on the screen ID 502. The screen ID 502 managed by each application is stored in the ROM 202, in the RAM 203, or in the HDD 204.

In step S906, the CPU 201 determines whether a record that matches the acquired screen ID 502 is stored in the setting screen transition DB 310. For example, the screen ID 502 of the two-sided copy operation manual screen 612 in FIG. 8B is "000001". Then, the CPU 201 compares the acquired screen ID 502 with the screen ID 502 in the management table of the setting screen transition DB 310 illustrated in FIG. 5. In this case, the acquired screen ID 502 matches the screen ID 502 in the first row of the management table in FIG. 5. Thus, it is determined that a record that matches the acquired screen ID 502 is stored.

As described above, it is checked whether the screen ID 502 is stored. If it is determined that the screen ID 502 is stored (Yes in step S906), the processing proceeds to step S907. If it is determined that the screen ID 502 is not stored (No in step S906), the processing proceeds to step S908.

In step S907, the operation manual app 301 acquires a URL corresponding to the screen ID 502. With reference to the example illustrated in step S906, the screen ID 502 is "000001" and matches the first row of the management table of FIG. 5. Thus, the operation manual app 301 acquires the URL "http://manual/copy/ryomen.html" described in the row of the URL that matches "000001".

In step S908, the operation manual app 301 acquires the URL of the main page of the operation manual. The URL of the main page of the operation manual is stored in the ROM 202, in the RAM 203, or in the HDD 204.

In step S909, the operation manual app 301 displays a page at the URL acquired in step S907 or S908.

As described above, according to the second exemplary embodiment, when an operation manual is displayed via a function setting screen of an application, it is possible to display, on an operation display unit of an image processing apparatus, a page of the operation manual corresponding to a function setting screen of each application. This saves the user the trouble or effort of searching for the operation manual regarding a function setting screen of a desired application.

Next, a third exemplary embodiment for carrying out the present disclosure is described mainly regarding the differences from the first exemplary embodiment. In the first exemplary embodiment, a screen of an application transitions to the operation manual in the state where a function setting of the application is changed by the user. When the operation manual transitions to the screen of the application again, a partially made function setting of the application is all discarded.

In the third exemplary embodiment, in a case where a function setting screen of an application transitions to the operation manual, if a function setting of the application is changed by the user, the changed setting value is saved. When the operation manual transitions to the screen of the application again, the operation manual transitions to the screen of the application in the state where the saved setting value is restored. The above example is described below.

FIGS. 10A to 10F illustrate an example of the flow of screens. After the user changes the setting value of a two-sided copying setting on the two-sided copying setting screen 604, the operation manual app 301 starts. An operation manual screen regarding copy density settings transitions to a density setting screen of the copy app 302. Then, the two-sided copying setting screen 604 of the copy app 302 is displayed again. In here, the URL 501, the screen ID 502, and the application type 503 illustrated in FIG. 5 are used for the description.

The two-sided copying setting screen 604 (FIG. 10A) is in the state where a setting is selected. The setting is made such that one side of a two-sided original document is copied on one side of a single sheet, and the other side of the two-sided original document is copied on the other side of the single sheet. On the two-sided copying setting screen 604, if the user selects the "operation manual" shortcut 621, the operation manual screen 611 (FIG. 10B) is displayed.

On the operation manual screen 611 (FIG. 10B), if the user selects "optionally adjust density" 656, an operation manual page 660 for optionally adjusting the density (FIG. 10C) is displayed. On the operation manual screen 611, a URL in the URL display portion 403 does not correspond to the URL 501. Thus, the "try out" button 404 is disabled in a grayed-out state.

On the operation manual page 660 for optionally adjusting the density (FIG. 10C), a URL in the URL display portion 403 corresponds to the URL 501. Thus, the "try out" button 404 is enabled. In this state, if the user selects the "copy" shortcut 650, the copy main screen 602 (FIG. 10D) is displayed. Alternatively, if the user selects the "try out" button 404, a setting screen 661 for adjusting the copy density (FIG. 10E) is displayed.

On the copy main screen 602 (FIG. 10D), if the user selects the "other functions" button 653, the "copy/other functions" screen 603 (FIG. 10F) is displayed.

On the setting screen 661 for adjusting the copy density (FIG. 10E), if the user selects an "OK" button 657 or a "cancel settings" button 658, the "copy/other functions" screen 603 (FIG. 10F) is displayed.

On the "copy/other functions" screen 603 (FIG. 10F), if the user selects the "two-sided" button 654, the two-sided copying setting screen 604 (FIG. 10A) is displayed. At this time, the two-sided copying setting screen 604 is displayed in the state where the setting for copying one side of a two-sided original document on one side of a single sheet, and copying the other side of the two-sided original document on one side of another single sheet is selected. At this time, on the setting screen 661 for adjusting the copy density (FIG. 10E), if the user changes the copy density, the setting value of the changed copy density is temporarily stored.

As described above, after the user changes a setting, and if a screen of an application transitions to the operation manual, and the user selects the "try out" button 404 of the operation manual, and the operation manual transitions to the screen of the application again, the previously changed setting is maintained. If the "copy" shortcut 650 of the operation manual is selected in the operation manual, and the operation manual transitions to the screen of the application again, the previously changed setting is also maintained.

Figure 11A:
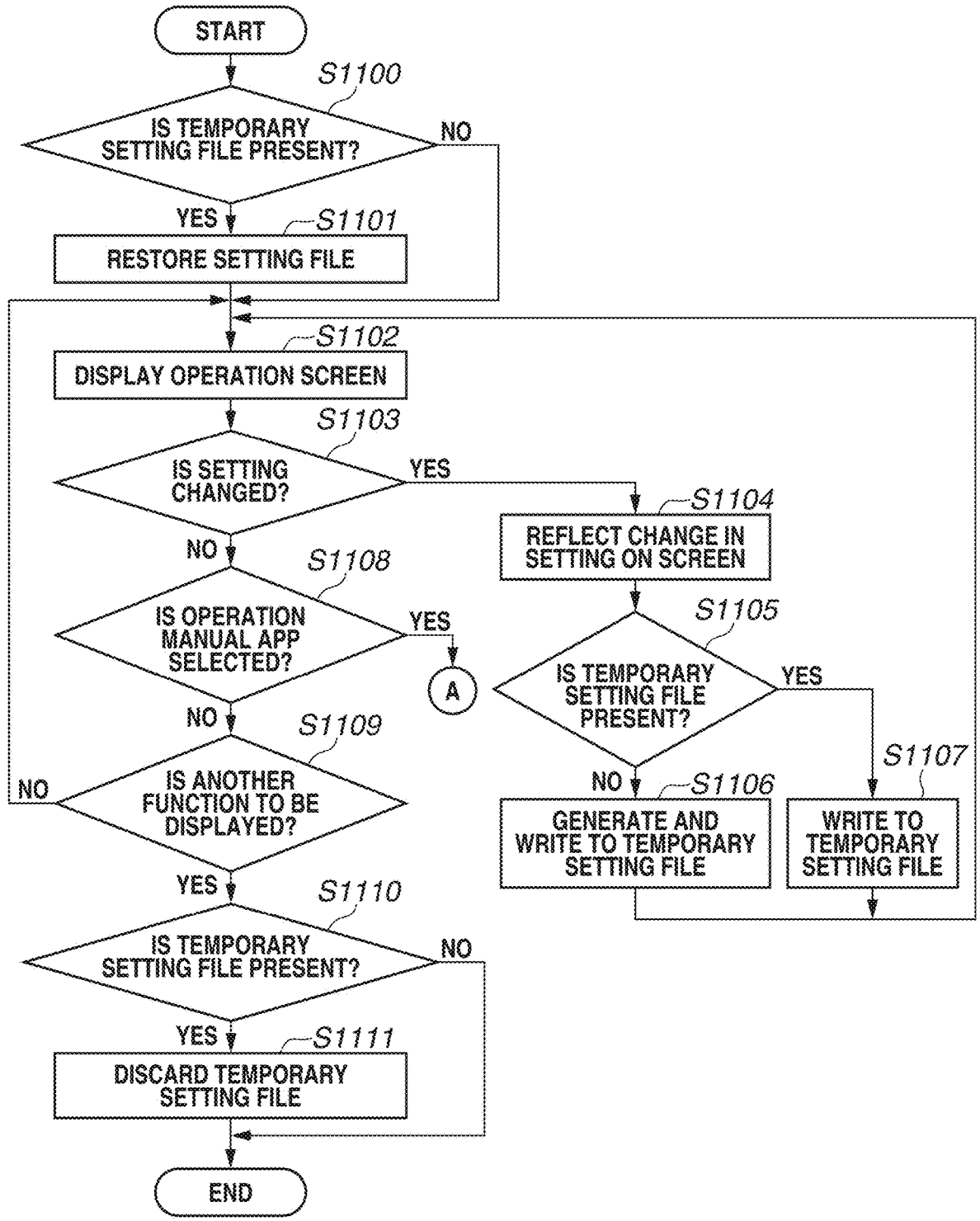
FIGS. 11A and 11B are flowcharts illustrating processing procedures according to the third exemplary embodiment.
Figure 11B:
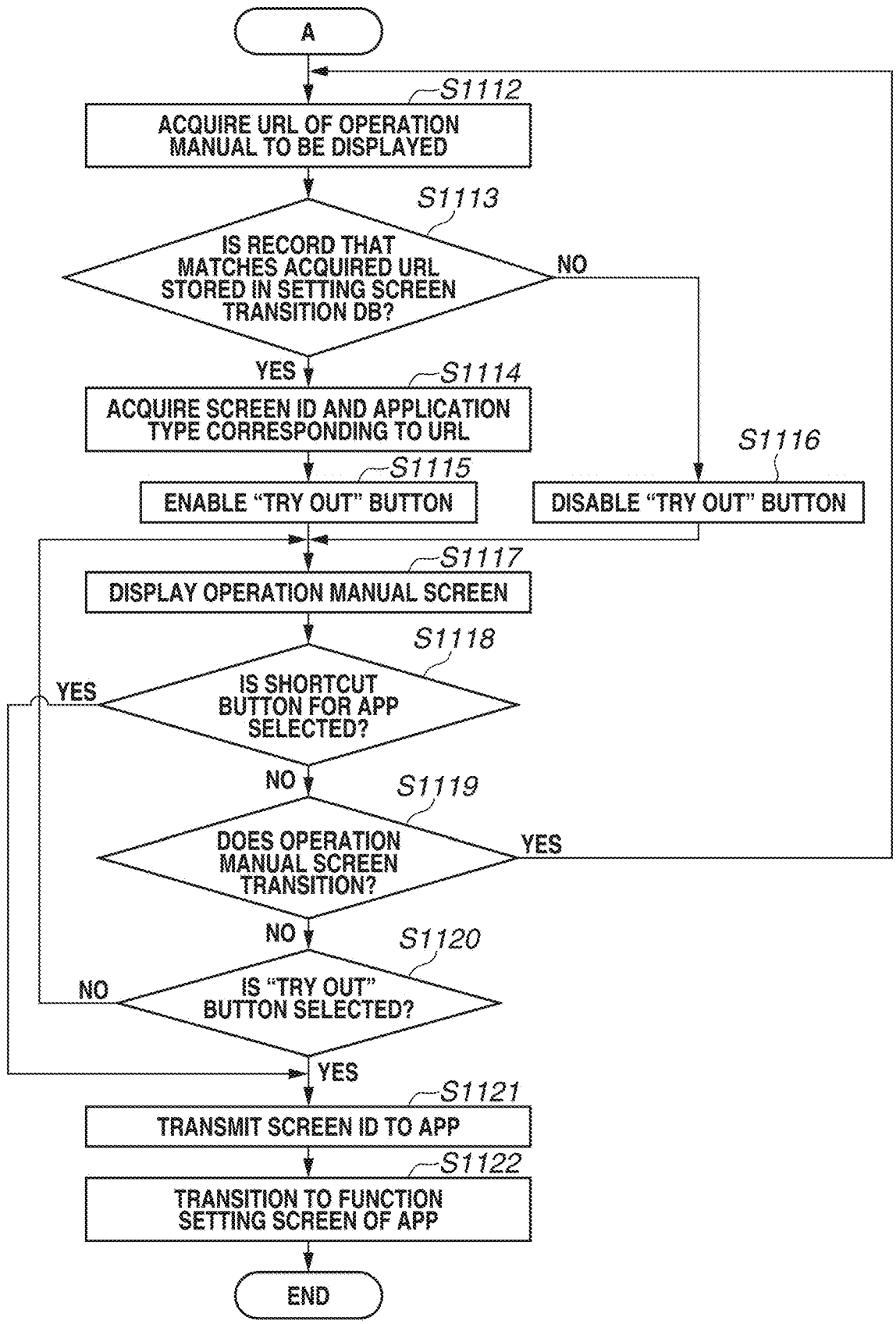

FIGS. 11A and 11B are flowcharts illustrating the processing of an application such as the copy app 302 or the send app 303 and the operation manual app 301 executed by the CPU 201 in the third exemplary embodiment.

In step S1100, the CPU 201 determines whether a temporary setting file (described below) is present. Specifically, the CPU 201 searches the HDD 204 in which a temporary setting file is saved, and determines whether the name of a temporary setting file is present. A temporary setting file is a file generated and saved when a setting is changed. The temporary setting file is stored in the HDD 204.

If the CPU 201 determines that a temporary setting file is present (Yes in step S1100), the processing proceeds to step S1101. If the CPU 201 determines that a temporary setting file is not present (No in step S1100), the processing proceeds to step S1102.

FIG. 12 illustrates a structure of a temporary setting file of the copy app 302 as an example of a setting value file of the application.

The temporary setting file includes an application type 1201 and a setting value 1202 for determining whether an original document is a two-sided document. Following the setting value 1202, other setting values are also described.

In step S1101, the CPU 201 reflects a setting of the temporary setting file on the function setting value of the application. Specifically, the CPU 201 reads the temporary setting file, and reads out a setting value described in the temporary setting file. The process of step S1100 may be executed only if the application such as the copy app 302 or the send app 303 is called by the "try out" button 404 of the operation manual app 301.

In step S1102, the CPU 201 displays a screen of any function other than the operation manual app 301 selected by the user.

In step S1103, the CPU 201 determines whether a function setting of the application is changed. For example, on the setting screen 661 for adjusting the copy density in FIG. 10E, if the user selects "increase density" 662, the changed setting value is temporarily stored. At this time, if the user selects the "OK" button 657, the CPU 201 determines that a setting is changed. If the "cancel settings" button 658 is selected, the CPU 201 determines that a setting is not changed. If CPU 201 determines that a setting is changed (Yes in step S1103), the processing proceeds to step S1104.

In step S1104, the CPU 201 performs the process of reflecting the setting changed by the user on the screen. Specifically, the CPU 201 closes a function setting screen of the application.

In step S1105, the CPU 201 determines whether a temporary setting file is present. The specific processing method is similar to that in the process of step S1101. If a temporary setting file is not present (No in step S1105), the processing proceeds to step S1106. If a temporary setting file is present (Yes in step S1105), the processing proceeds to step S1107.

In step S1106, the CPU 201 generates a temporary setting file and writes the setting value that is set to the temporary setting file.

In step S1107, the CPU 201 writes the changed setting value to the temporary setting file, and the processing proceeds to step S1102.

If it is determined in step S1103 that a setting is not changed (No in step S1103), the processing proceeds to step S1108. In step S1108, the CPU 201 determines whether the user selects the "operation manual" shortcut 621. If it is determined that the "operation manual" shortcut 621 is not selected (No in step S1108), the processing proceeds to step S1109.

In step S1109, the CPU 201 determines whether an instruction is given to display another function different from that of the screen that is being displayed. If it is determined that an instruction to display another function is given (Yes in step S1109), the processing proceeds to step S1110. If it is determined that an instruction to display another function is not given (No in step S1109), the processing proceeds to step S1102.

In step S1110, the CPU 201 determines whether a temporary setting file is present. If it is determined that a temporary setting file is present (Yes in step S1110), the processing proceeds to step S1111. If it is determined that a temporary setting file is not present (No in step S1110), the processing ends.

In step S1111, the CPU 201 discards the temporary setting file.

If it is determined in step S1108 that the "operation manual" shortcut 621 is selected (Yes in step S1108), the processing proceeds to step S1112 in FIG. 11B (similar to FIG. 7).

The contents of steps S1112 to S1117 in FIG. 11B are similar to those of steps S700 to S705 in FIG. 7, and therefore are not described here.

Then, if it is detected in step S1118 that a shortcut button for an app is selected (Yes in step S1118), the processing proceeds to step S1121. If it is not detected that a shortcut button for an app is selected (No in step S1118), the processing proceeds to step S1119.

The contents of steps S1119 to S1122 are similar to those of steps S706 to S709 in FIG. 7, and therefore are not described here.

As described above, according to the third exemplary embodiment, when a screen of an application such as the copy app 302 transitions to the operation manual app 301 in the state where a function setting of the application is changed, the changed setting value is temporarily saved. In a case where the operation manual transitions to the screen of the application again, the operation manual transitions to the screen of the application in the state where the saved setting value is restored. Consequently, the user can view the screen of the application and the operation manual without needing to consider the discarding of the function setting of the application.

Other Embodiments

In the above exemplary embodiments, the image forming apparatus 100 having a plurality of functions such as a copy app and a send app has been described as an example. Embodiments of the present disclosure, however, are also applicable to an image processing apparatus having only some of these functions.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-242442, filed Dec. 19, 2017, which is hereby incorporated by reference herein in its entirety.

What is claimed is:

1. An image processing apparatus having a web browser function, comprising:
   a display control unit configured to display, in a predetermined display region on an operation unit, an operation manual of the image processing apparatus that is composed of a web page; and
   a storage unit configured to store an identifier for accessing a web page of the operation manual and a screen provided by an application included in the image processing apparatus, wherein, based on an identifier corresponding to a web page displayed on the operation unit and the screen, the display control unit displays, on the operation unit, a display item for transitioning to a screen of a function provided by the application included in the image processing apparatus.

2. The image processing apparatus according to claim 1, wherein in response to selection of the display item, the display control unit starts an application for executing a function corresponding to the web page displayed on the operation unit and performs control so that a screen for executing the function is displayed on the operation unit.

3. The image processing apparatus according to claim 1, wherein in a case where, based on the identifier corresponding to the web page displayed on the operation unit and relevant information, it is determined that a function corresponding to the web page that is being displayed is not found, the display control unit performs control so that the display item is displayed in an unselectable state on the operation unit.

4. The image processing apparatus according to claim 3, wherein the display item in the unselectable state is displayed in a grayed-out state in a case where it is determined that a function corresponding to the web page that is being displayed is not found.

5. The image processing apparatus according to claim 1, wherein the storage unit stores relevant information associating at least a Uniform Resource Locator, which is an identifier for accessing a web page of the operation manual, a first identifier for identifying an application, and a second identifier for specifying a screen to be displayed from among a plurality of screens provided by the application.

6. The image processing apparatus according to claim 5, further comprising a start unit configured to, based on an identifier of an application, start the application,
wherein the display control unit, based on the first identifier associated with the identifier corresponding to the web page displayed on the operation unit, requests the start unit to start an application.

7. The image processing apparatus according to claim 6, wherein in response to selection of the display item for transitioning to the operation manual by a user operation in a state where the screen of the application included in the image processing apparatus is displayed on the operation unit, and based on information of the application that is being displayed on the operation unit, information of the screen displayed on the operation unit by the application, and relevant information stored in the storage unit, the display control unit determines a Uniform Resource Locator for accessing a web page corresponding to the screen and performs control so that a web page of the operation manual obtained by accessing the Uniform Resource Locator is displayed in the predetermined display region on the operation unit.

8. The image processing apparatus according to claim 6, wherein the application stores information indicating a change in a setting made via a screen of the application, and
wherein in a case where the application is started in response to selection of the display item, the application restores the setting based on the stored information indicating the change in the setting.

9. The image processing apparatus according to claim 1, further comprising a printing unit configured to form an image on a sheet,
wherein the application included in the image processing apparatus includes at least a copy application.

10. A control method for controlling an image processing apparatus having a web browser function, the control method comprising:
displaying, in a predetermined display region on an operation unit, an operation manual of the image processing apparatus that is composed of a web page; and
storing an identifier for accessing a web page of the operation manual, and a screen provided by an application included in the image processing apparatus,
wherein, based on an identifier corresponding to a web page displayed on the operation unit and the screen, a display item for transitioning to a screen of a function provided by the application included in the image processing apparatus is displayed on the operation unit.

11. A non-transitory computer-readable storage medium storing instructions that when executed by at least one or more processors cause the at least one or more processors to execute a method for controlling an image processing apparatus having a web browser function, the method comprising:
displaying, in a predetermined display region on an operation unit, an operation manual of the image processing apparatus that is composed of a web page; and
storing an identifier for accessing a web page of the operation manual, and a screen provided by an application included in the image processing apparatus,
wherein, based on an identifier corresponding to a web page displayed on the operation unit and the screen, a display item for transitioning to a screen of a function provided by the application included in the image processing apparatus is displayed on the operation unit.

* * * * *